United States Patent [19]
Itoh et al.

[11] Patent Number: 5,973,840
[45] Date of Patent: Oct. 26, 1999

[54] PROJECTION DISPLAY AND ILLUMINATING OPTICAL SYSTEM FOR IT

[75] Inventors: Yoshitaka Itoh; Toshiaki Hashizume, both of Suwa, Japan

[73] Assignee: Seiko Epson Corporation, Tokyo, Japan

[21] Appl. No.: 09/091,834

[22] PCT Filed: Oct. 27, 1997

[86] PCT No.: PCT/JP97/03901

§ 371 Date: Jun. 29, 1998

§ 102(e) Date: Jun. 29, 1998

[87] PCT Pub. No.: WO98/19212

PCT Pub. Date: Jul. 5, 1998

[30] Foreign Application Priority Data

Oct. 30, 1996 [JP] Japan .................................. 8-305734
Mar. 27, 1997 [JP] Japan .................................. 9-94677

[51] Int. Cl.$^6$ ............................ G02B 27/10; G02B 27/14
[52] U.S. Cl. ........................... 359/618; 359/619; 359/634
[58] Field of Search .................................. 359/618, 619, 359/622, 634; 353/31, 98, 99

[56] References Cited

U.S. PATENT DOCUMENTS 5,719,706  2/1998  Masumoto et al. .................... 359/622
5,777,804  7/1998  Nakamura et al. .................... 359/727

FOREIGN PATENT DOCUMENTS

A 646828   4/1995   European Pat. Off. .
A 1302385  12/1989  Japan .
U 3-71342  7/1991   Japan .
A 9-113994 5/1997   Japan .

*Primary Examiner*—Scott J. Sugarman
*Assistant Examiner*—Ricky Mack
*Attorney, Agent, or Firm*—Oblon, Spivak, McClelland, Maier & Neustadt, P.C.

[57] ABSTRACT

An apparatus which makes dark lines due to a central axis of a cross dichroic prism sufficiently inconspicuous. In a second lens array, minute lenses arranged on the same column include three different types of minute lenses having optical axes at different positions. Each row of the minute lenses consists of one of the three types of minute lenses. Partial light fluxes respectively passing through the minute lenses have optical axes at different positions relative to a center of a lighting area of a liquid-crystal light bulb, so as to illuminate different illumination areas.

18 Claims, 18 Drawing Sheets

PROJECTION DISPLAY APPARATUS

CROSS DICHROIC PRISM 48

PROJECTION DISPLAY AND ILLUMINATING OPTICAL SYSTEM FOR IT

BACKGROUND OF THE INVENTION

1. Field of the Invention

The present invention relates to a projection display apparatus with colored light combining means and a lighting optical system therefor.

2. Discussion of the Background

A cross dichroic prism is often used for projection display apparatus that project a color image on a projection screen. For example, in a transmissive liquid-crystal projector, the cross dichroic prism is utilized as colored light combining means that combines three colored rays of red, green, and blue and emits the composite light in a common direction. In a reflective liquid-crystal projector, the cross dichroic prism is utilized as colored light separation means that separated a beam of white light into three colored rays of red, green, and blue and also as colored light combining means that recombines modulated three colored rays and emits the composite light in a common direction. A known example of the projection display apparatus with the cross dichroic prism is disclosed in JAPANESE PATENT LAID-OPEN GAZETTE No. 1-302385.

FIG. 17 conceptually illustrates a main part of a projection display apparatus. The projection display apparatus includes three liquid-crystal light valves 42, 44, and 46, a cross dichroic prism 48, and a projection lens system 50. The cross dichroic prism 48 combines three colored rays of red, green, and blue modulated by the three liquid-crystal light valves 42, 44, and 46 light and emits the composite light toward the projection lens system 50. The projection lens system 50 focuses the composite light on a projection screen 52.

FIG. 18 is a partly decomposed perspective view illustrating the cross dichroic prism 48. The cross dichroic prism 48 includes four right-angle prisms which are bonded to one another via the respective right-angle surfaces by an optical adhesive.

FIG. 19 shows a problem arising in the case of utilizing the cross dichroic prism 48. As shown in FIG. 19(A), the cross dichroic prism 48 has a red light reflection film 60R and a blue light reflection film 60B which are arranged in a substantially X shape on an X-shaped interface formed by the right-angle surfaces of the four right-angle prisms. There is an X-shaped layer of optical adhesive 62 formed in the gaps between the four right-angle prisms. Both the reflection films 60R and 60B accordingly have gaps at a central axis 48a of the cross dichroic prism 48.

When a light beam passing through the central axis 48a of the cross dichroic prism 48 is projected on the projection screen 52, a dark line due to the central axis 48a may be formed in the projected image. FIG. 19(B) shows an example of the dark line DL. The dark line DL represents a relatively dark, linear area having a different color from that of the other part and is formed substantially on the center of the projected image. It is considered that the dark line DL is ascribed to scattering of rays and no-reflection of the red light and blue light in the gaps of the reflection films in the vicinity of the central axis 48a. A similar problem arises in a cross dichroic mirror that includes two dichroic mirrors that are arranged in an X shape and respectively have selective reflection films, such as a red reflection film and a blue reflection film. In this case, a dark line due to a central axis of the mirror is formed in a projected image.

As described above, in the prior-art projection display apparatus, a dark line is formed substantially on the center of a projected image because of the central axis of the cross dichroic prism 48 or the cross dichroic mirror.

SUMMARY OF THE INVENTION

The object of the present invention is thus to solve the above problem in the prior art and make a dark line due to a central axis of an optical means inconspicuous, where the optical means includes two dichroic films arranged substantially in an X shape and may be a cross dichroic prism or a cross dichroic mirror.

The principle for solving the problem is described first with a concrete example shown in FIGS. 1 through 4. In the drawings, z direction denotes the direction of the course of light, x direction denotes the direction of 3 o'clock seen from the direction of the course of light (the z direction), and y direction denotes the direction of 12 o'clock. In the description below, the x direction represents the direction of rows and the y direction represents the direction of columns for the matter of convenience. Although the description of the principle is based on a concrete example for the better understanding, the present invention is not restricted to this concrete structure in any sense.

In a projection display apparatus, a lighting optical system with two lens arrays each including a plurality of small lenses (hereinafter referred to as an integrator optical system) as specified in WO94/22042 is known as the technique for dividing light from a light source into a plurality of partial light fluxes and thereby reducing an in-plane unevenness of the illuminance of light.

FIG. 1 shows the principle of forming a dark line when an integrator optical system is adopted in a projection display apparatus with a cross dichroic prism. FIGS. 1(A-1) and 1(B-1) show light fluxes (shown by the solid lines) passing through a plurality of small lenses 10 which are different in position in the x direction, that is, a plurality of small lenses 10 existing in different columns, and traces of their central optical axes (shown by the fine dotted lines). FIGS. 1(A-2) and 1(B-2) show the positions of dark lines DLa and DLb formed on a screen 7.

A light flux emitted from a light source (not shown) is divided into a plurality of partial light fluxes by first and second lens arrays 1 and 2 each including the plurality of small lenses 10. The light fluxes passing through the respective small lenses 10 included in the first and the second lens arrays 1 and 2 are converted to light fluxes parallel to the respective central axes of the partial light fluxes by means of a paralleling lens 15. The partial light fluxes passing through the paralleling lens 15 are superposed on a liquid-crystal light valve 3, so that a predetermined area is uniformly illuminated with the superposed light fluxes. Although only one liquid-crystal light valve 3 is shown in FIG. 1, the principle of the integrator optical stem and the principle of forming a dark line are also applicable to the her two liquid-crystal light valves.

FIG. 2 is a perspective view illustrating the appearance of the first and the second lens arrays 1 and 2. Each of the first and the second lens arrays 1 and 2 includes the small lenses 10 that respectively have a substantially rectangular outline and are arranged in a matrix of M rows and N columns. In this example, M=10 and N=8. FIG. 1(A-1) shows the trace of partial light fluxes passing through the small lenses 10 of the second column, whereas FIG. 1(B-1) shows the trace of partial light fluxes passing through the small lenses 10 of the seventh column.

The light fluxes superposed on the liquid-crystal light valve 3 are subjected to modulation responsive to image information in the liquid-crystal light valve 3 and enter a cross dichroic prism 4. The light flux output from the cross dichroic prism 4 is projected on the screen 7 via a projection lens system 6.

As shown by the rough dotted lines in FIGS. 1(A-1) and 1(B-1), light fluxes passing through a central axis 5 (along the y direction in the drawing) of the cross dichroic prism 4 are projected at positions Pa and Pb on the screen 7. As discussed previously in the prior art, scattering of the rays and no-reflection of the light to be reflected in the gaps between reflection films in the vicinity of the central axis 5 reduce the quantity of light passing through the vicinity of the central axis 5. As shown in FIGS. 1(A-2) and 1(B2), the reduction causes dark lines DLa and DLb, which have the lower luminance than the area around luminance on the projection screen 7.

The dark line has the following relation to the first and the second lens arrays 1 and 2. As clearly shown in FIG. 3(A), which is a partial enlarged view of FIG. 1(A-1), the image formed by the liquid-crystal light valve 3 is inverted and magnified by the projection lens system 6 and projected on the projection screen 7. FIG. 3(B) is a cross sectional view showing an x-y plane including the central axis 5 of the cross dichroic prism 4. Referring to FIGS. 3(A) and 3(B), in case that a partial light flux is cut by the x-y plane including the central axis 5 of the cross dichroic prism 4, r1 denotes a distance from one end 11 of a cross section 8 of the partial light flux to the central axis 5, and r2 denotes a distance from the other end 12 of the cross section 8 of the partial light flux to the central axis 5. The image of the cross section 8 of the partial light flux is inverted and magnified by the projection lens system 6 and projected on the projection screen 7. A ratio of a distance R2 from one end 13 of a projection area 9 on the projection screen 7 to the dark line DLa to a distance R1 from the other end of the projection area 9 to the dark line DLa is accordingly equal to the ratio of r2 to r1. In other words, the position where the dark line DLa is formed depends upon the position where the cross section 8 of the partial light flux exists relative to the central axis 5 in the x-y plane including the central axis 5 of the cross dichroic prism 4.

In the examples of FIGS. 1(A-1) and 1(B-1), the partial light fluxes have cross sections at different positions in the x-y plane including the central axis of the cross dichroic prism 4. This means that the dark lines DLa and DLb are formed at different positions. In a similar manner, the partial light fluxes passing through the small lenses 10 existing in the columns other than the second column and the seventh column in the first and the second lens arrays 1 and 2 have cross sections at different positions in the x-y plane including the central axis 5 of the cross dichroic prism 4. A number of dark lines corresponding to the number of columns included in the first and the second lens arrays 1 and 2, N dark lines in this example, are thus formed on the projection screen 7.

The partial light fluxes passing through the M small lenses arranged on the same column in the first and the second lens arrays 1 and 2 form dark lines DLc at approximately the same position on the projection screen 7 as shown in FIG. 4. Each of the N dark lines is formed by superposing the partial light fluxes passing through the M small lenses arranged on the same column in the first and the second lens arrays 1 and 2. The degree of darkness of each dark line is substantially identical with the summation of the degree of darkness of the dark lines formed by the respective small lenses.

The above description leads to the following principles.

(First Principle)

The first principle is that the different positions of the central axes of the partial light fluxes relative to the central axis 5 of the cross dichroic prism 4 cause dark lines to be formed at different positions. The partial light fluxes passing through the different columns included in the first and the second lens arrays 1 and 2 are different in position relative to the central axis 5 of the cross dichroic prism 4 and thereby form dark lines at different positions.

(Second Principle)

The second principle is that the different positions of the cross sections of the partial light fluxes in the x-y plane including the central axis 5 of the cross dichroic prism 4 are ascribed to the difference in incident angles of the partial light fluxes entering the cross dichroic prism 4 (see FIG. 1). The partial light fluxes passing through the different columns included in the first and the second lens arrays 1 and 2 enter the cross dichroic prism 4 at different incident angles and thereby have cross sections at different positions relative to the central axis 5.

Namely different incident angles of the partial light fluxes entering the cross dichroic prism 4 or different angles of the partial light fluxes superposed on the liquid-crystal light valve 3 cause dark lines to be formed at different positions.

(Conclusions)

As discussed previously, the partial light fluxes passing through the M small lenses arranged on the same column in the first and the second lens arrays 1 and 2 respectively form dark lines at substantially the same position on the projection screen 7. The degree of darkness of each resulting dark line is substantially equal to the summation of the degree of darkness of the dark lines formed by the respective small lenses. A desired arrangement accordingly causes dark lines to be formed at different positions on the projection screen 7 by the respective partial light fluxes passing through the M small lenses. Although increasing the total number of dark lines, this arrangement decreases the degree of darkness per each dark line, thereby making each dark line sufficiently inconspicuous. It is, however, not required to cause all the dark lines to be formed at different positions by the respective partial light fluxes passing through the M small lenses. One preferable application accordingly causes only part of the dark lines to be formed at different positions.

Formation of dark lines at different positions is realized according to either one of the first principle and the second principle discussed above.

Based on the first principle, as for part of the partial light fluxes passing through the M small lenses arranged on the same column, the positions of the central axes of the partial light fluxes relative to the central axis 5 of the cross dichroic prism 4 should be changed from the others.

Based on the second principle, as for part of the partial light fluxes passing through the M small lenses arranged on the same column, the angles of the partial light fluxes superposed on the liquid-crystal light valve 3 or the incident angles of the partial light fluxes entering the cross dichroic prism 4 should be changed from the others.

The present invention has solved the problem of the prior art discussed previously according to the above principles. The following describes the means for solving the problem and its functions and effects.

(Means for Solving the Problems and its Functions and Effects)

The present invention is directed to a lighting optical system for emitting light for use in a projection display apparatus comprising: colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, the lighting optical system comprising: a dividing and superposing optical system that divides a light flux into a plurality of partial light fluxes, which are arranged in directions of columns and rows, and superposes the plurality of partial light fluxes, the columns being substantially parallel to the central axis of the colored light combining means, the rows being substantially perpendicular to the direction of columns, wherein the dividing and superposing optical system is constructed to shift, in the direction of rows, an illumination area on each light modulation means illuminated with part of the partial light fluxes among the partial light fluxes on an identical column from an illumination area illuminated with the other partial light fluxes among the partial light fluxes on the identical column.

One partial light flux projects the central axis of the colored light combining means on the projection surface and forms a dark line corresponding to the central axis. A plurality of partial light fluxes arranged on one column generally project the central axis of the colored light combining means at substantially the same position on the projection surface and forms a dark line. In the above arrangement, the illumination area on the light modulation means illuminated with part of the partial light fluxes is shifted from the illumination area illuminated with the other partial light fluxes in the direction of rows (in the direction virtually perpendicular to the direction of columns substantially parallel to the central axis). Based on the first principle discussed above, the position of the central optical paths of the part of the partial light fluxes relative to the central axis of the colored light combining means can be shifted from the position of the central optical paths of the other partial light fluxes. This causes the part of the partial light fluxes and the other partial light fluxes to form dark lines at different positions. This arrangement accordingly makes the dark lines formed on a projected image sufficiently inconspicuous.

In accordance with one preferable arrangement of the lighting optical system, the dividing and superposing optical system comprises: a first lens array having a plurality of small lenses arranged in the directions of columns and rows; and a second lens array having a plurality of small lenses respectively arranged corresponding to the plurality of small lenses of the first lens array, wherein, in the second lens array, at least part of the small lenses among at least one column of the small lenses arranged in the direction of columns have optical centers different from optical centers of the other small lenses in the at least one column.

In this preferable arrangement, among a plurality of small lenses arranged at least on one column, part of the small lenses, which part of the partial light fluxes pass through, have optical centers at a different position from optical centers of the other small lenses. This causes the optical paths of the part of the partial light fluxes to be shifted from the optical paths of the other partial light fluxes. Based on the first principle discussed above, this arrangement prevents the plurality of partial light fluxes from projecting the central axis of the colored light combining means at substantially the same position. This accordingly makes dark lines formed on a projected image sufficiently inconspicuous.

In the lighting optical system of this arrangement, it is preferable that the part of the small lenses are eccentric lenses having optical centers at a different position from the position of the optical centers of the other small lenses, in order to cause an illumination area on a lighting area by the partial light fluxes passing through the part of the small lenses to be shifted in the direction of rows from an illumination area on the lighting area by the partial light fluxes passing through the other small lenses.

This arrangement causes the optical paths of the partial light fluxes passing through the part of the small lenses to be shifted from the optical paths of the partial light fluxes passing through the other small lenses. Based on the first principle discussed above, this arrangement prevents the plurality of partial light fluxes from projecting the central axis of the colored light combining means at substantially the same position. This accordingly makes dark lines formed on a projected image sufficiently inconspicuous.

In the lighting optical system of the above arrangement, it is preferable that a plurality of small lenses located on an identical column are divided into a plurality of groups, small lenses included in an identical group have optical centers at an identical position relative to a lens center, and small lenses included in different groups have optical centers at different positions relative to the lens center.

In this arrangement, the respective groups have different optical paths of the partial light fluxes passing through the small lenses. Namely the respective groups form the dark line corresponding to the projected central axis of the colored light combining means at different positions and prevents the central axis of the colored light combining means from being projected at substantially the same position.

It is further preferable that the plurality of small lenses located on an identical column are divided into the plurality of groups so that a total quantity of light of the partial light fluxes passing through each of the plurality of groups is equal to each other.

The difference in total quantity of light of the partial light fluxes passing through each group varies the degree of darkness of the dark line corresponding to the central axis of the colored light combining means projected by the partial light fluxes passing through the group. The object of the present invention is to make these dark lines sufficiently inconspicuous. The human's eyes have relatively high discriminating power based on the relative comparison, and the difference in degree of darkness among the dark lines is accordingly undesirable. The identical total quantity of light of the partial light fluxes passing through each group thus equalizes the degree of darkness of the dark lines formed by the partial light fluxes passing through the respective groups.

The plurality of groups may be at least two sections divided in the direction of columns. This simple arrangement prevents the central axis of the colored light combining means from being projected at substantially the same position.

In one preferable arrangement, the plurality of groups are two sections divided in the direction of columns, optical centers of a plurality of small lenses included in one of the two sections and optical centers of a plurality of small lenses included in the other of the two sections are symmetrical about the lens center.

In this arrangement, the other section includes the same small lenses as those of one section, which are arranged upside down. Namely the second lens array consists of only one type of small lenses.

In the lighting optical system of any one of the above arrangement, it is preferable that the plurality of small lenses included in the second lens array have optical centers that are arranged symmetrically about a center of the second lens array corresponding to a center of an optical axis of a light source.

The light source used in the projection display apparatus generally has the largest quantity of light on the center of the optical axis, and the quantity of light decreases with an increase in distance from the center of the optical axis. In case that such a light source is used in the projection display apparatus, the above preferable arrangement can equalize the degree of darkness of all the plurality of dark lines corresponding to the central axis of the colored light combining means projected by the partial light fluxes passing through the plurality of small lenses included in the second lens array.

In the lighting optical system of any one of the above arrangement, in accordance with one application, the dividing and superposing optical system further comprises: a superposing lens which superposes and condenses a plurality of partial light fluxes, which have passed through the plurality of small lenses in the first lens array and the plurality of small lenses in the second lens array, substantially on an illuminating position of each light modulation means; and a polarizing element interposed between the second lens array and the superposing lens, wherein the polarizing element comprises: a polarization beam splitter array which has plural sets of a polarization separating film and a reflecting film that are parallel to each other, the polarization beam splitter array separating each of the plurality of partial light fluxes passing through the plurality of small lenses of the second lens array into two types of linear polarized light components; and a polarizer which equalizes polarizing directions of the two types of linear polarized light components separated by the polarization beam splitter array.

This arrangement converts the light including rays of random polarized light to one type of polarized light and thereby enhances the utilization efficiency of light.

The present invention is also directed to a projection display apparatus comprising: a lighting optical system which emits light; colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises a dividing and superposing optical system that divides a light flux into a plurality of partial light fluxes, which are arranged in directions of columns and rows, and superposes the plurality of partial light fluxes, the columns being substantially parallel to the central axis of the colored light combining means, the rows being substantially perpendicular to the direction of columns, and wherein the dividing and superposing optical system is constructed to shift, in the direction of rows, an illumination area on each light modulation means illuminated with part of the partial light fluxes among the partial light fluxes located on a same column from an illumination area illuminated with the other partial light fluxes among the partial light fluxes located on the identical column.

Like the respective lighting optical systems described above, the projection display apparatus including any one of the above lighting optical systems can make dark lines formed on a projected image sufficiently inconspicuous.

DETAILED DESCRIPTION OF THE PREFERRED EMBODIMENTS

Some modes of carrying out the present invention are described below as preferred embodiments. In the following description, z direction denotes the direction of the course of light, x direction denotes the direction of 3 o'clock seen from the direction of the course of light (the z direction), and y direction denotes the direction of 12 o'clock.

A. First Embodiment

Figure 1:
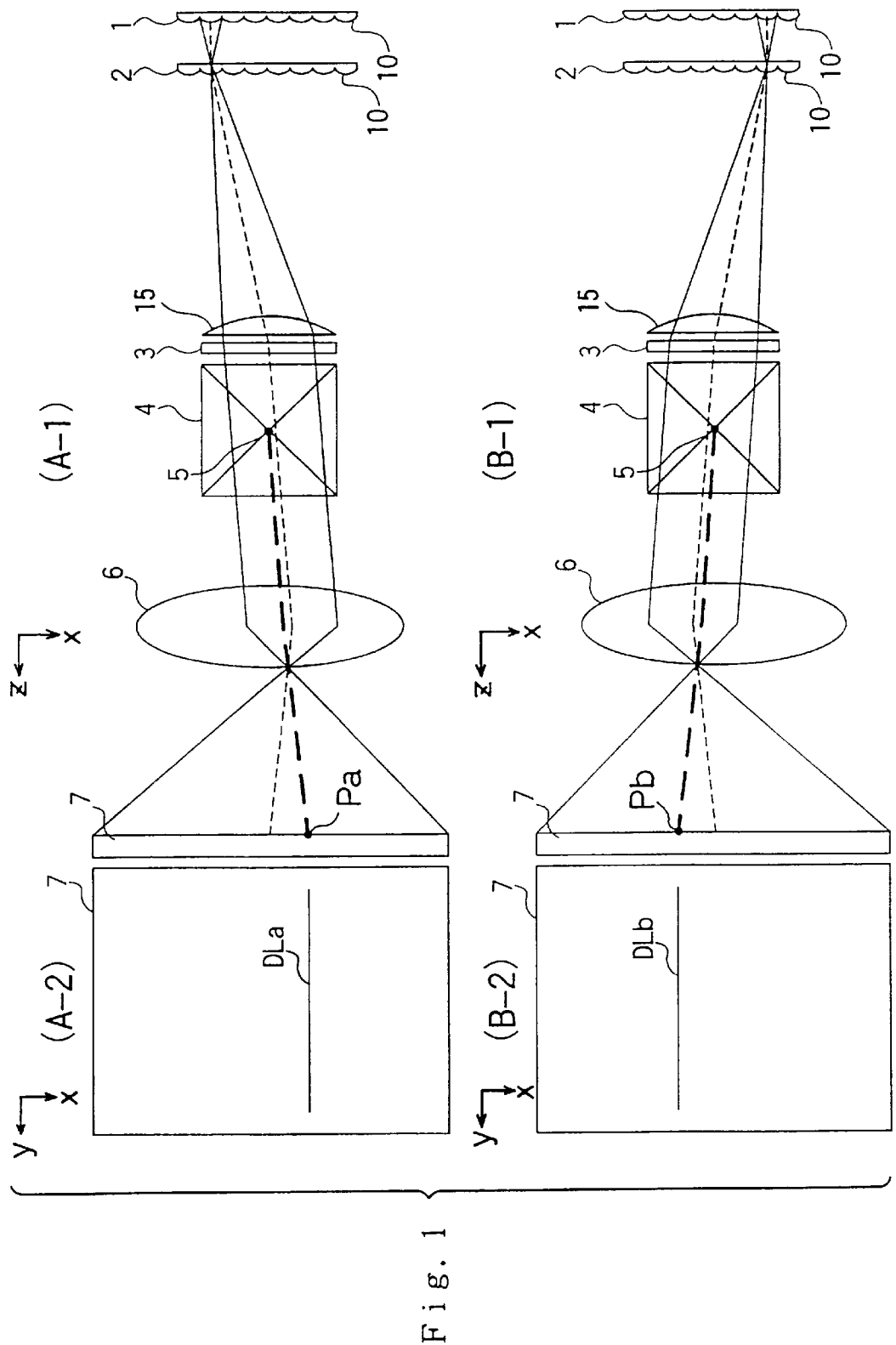
FIG. 1 shows the principle of forming a dark line when an integrator optical system is adopted in a projection display apparatus with a cross dichroic prism.
Figure 2:
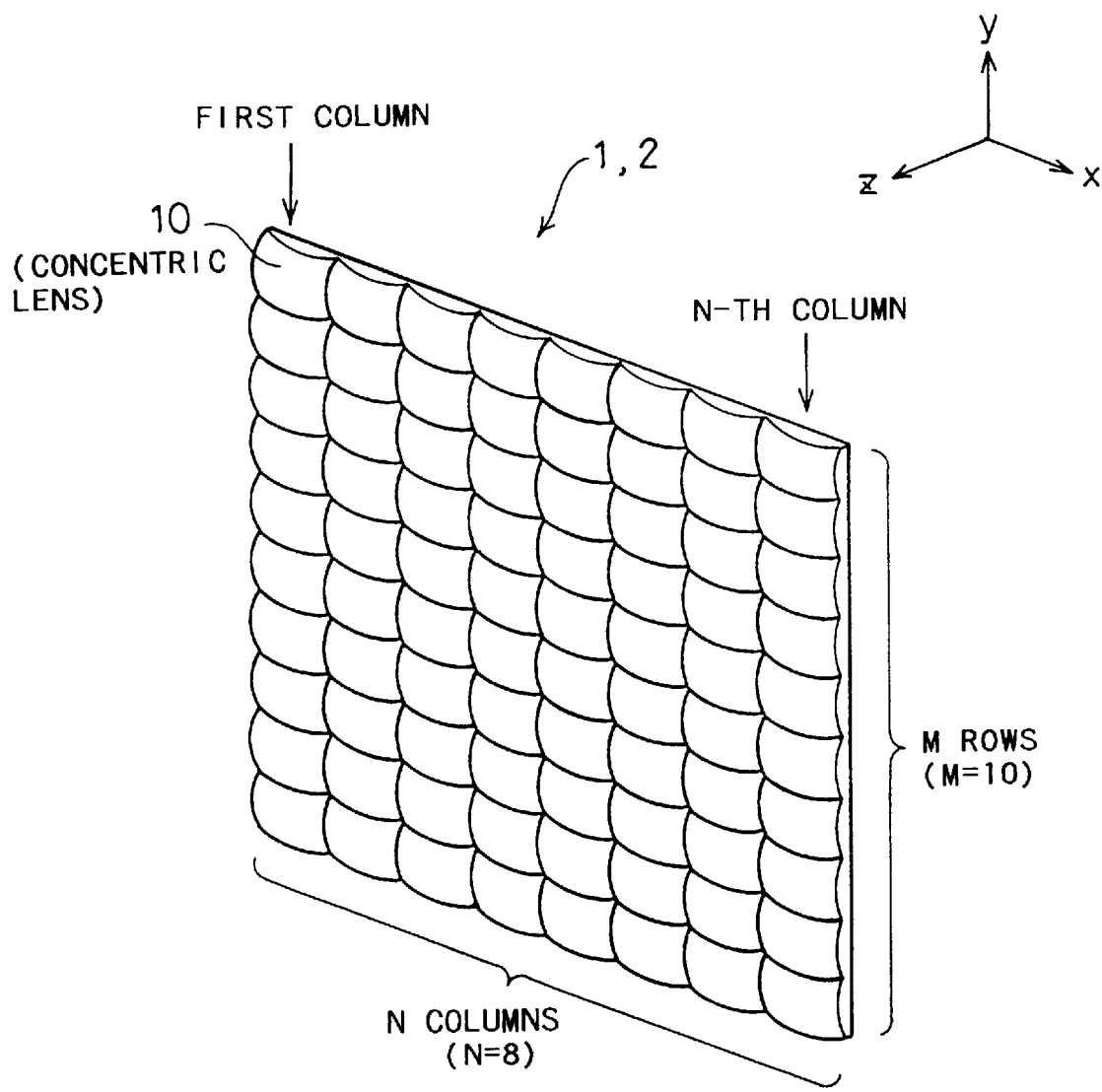
FIG. 2 is a perspective view illustrating the appearance of first and second lens arrays 1 and 2.
Figure 3:
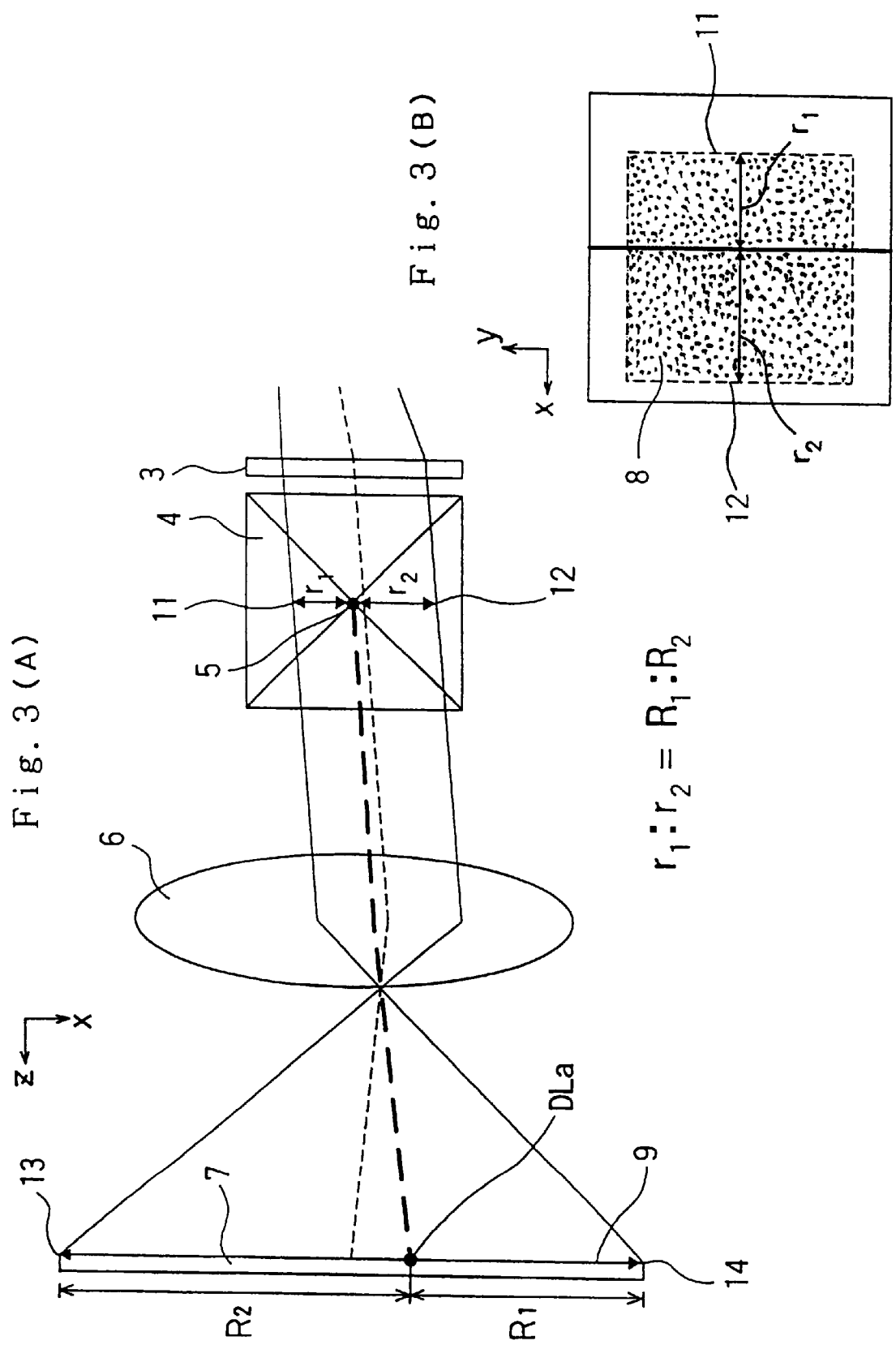
FIGS. 3(A) and 3(B) are a partial enlarged view of FIG. 1(A-1) and a cross sectional view showing an x-y plane including a central axis 5 of a cross dichroic prism 4.
Figure 4:
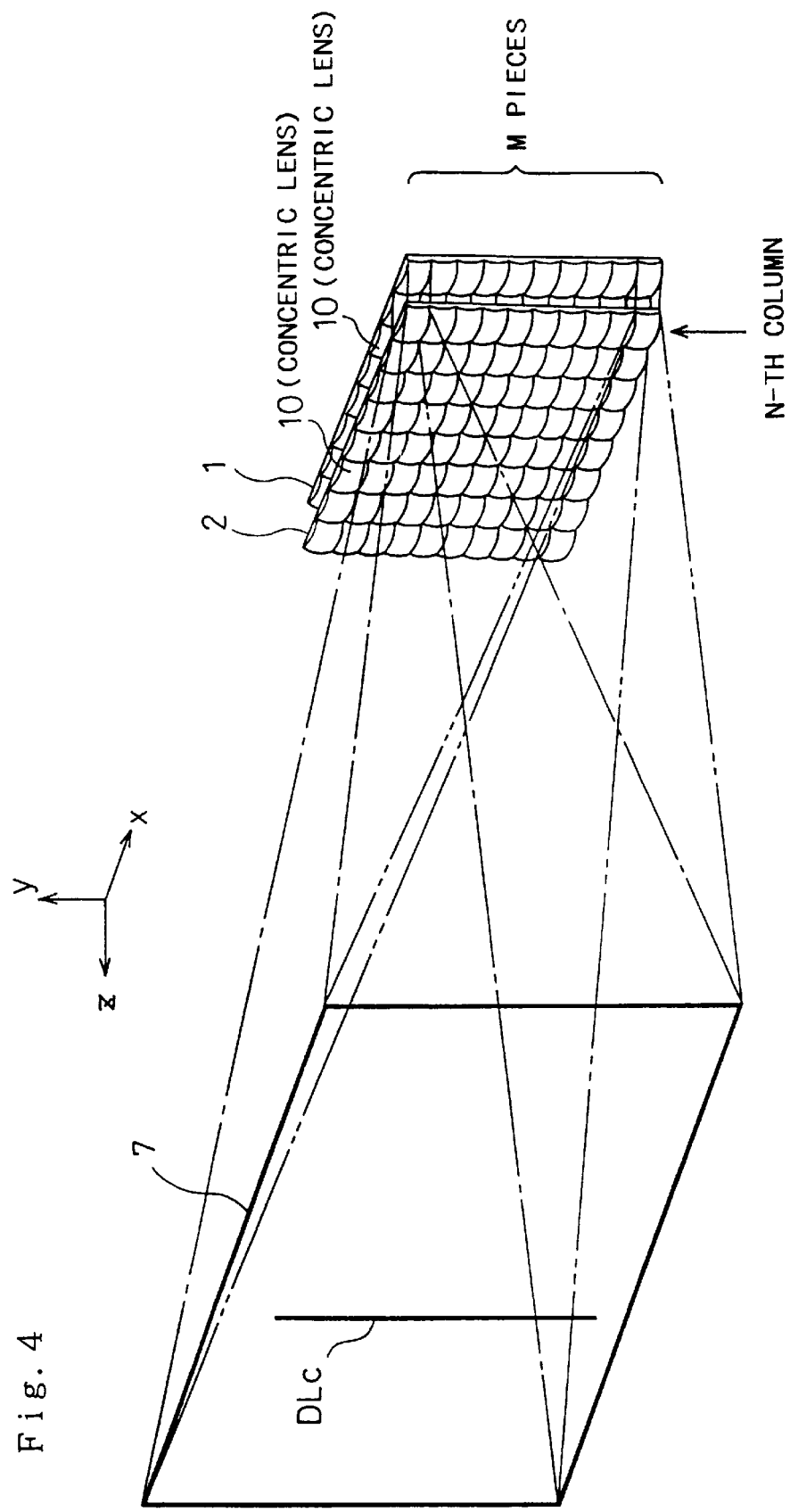
FIG. 4 conceptually shows the state in which the partial light fluxes which have passed through small lenses arranged on an N-th column in the two lens arrays 1 and 2 are projected on a projection screen 7.
Figure 5:
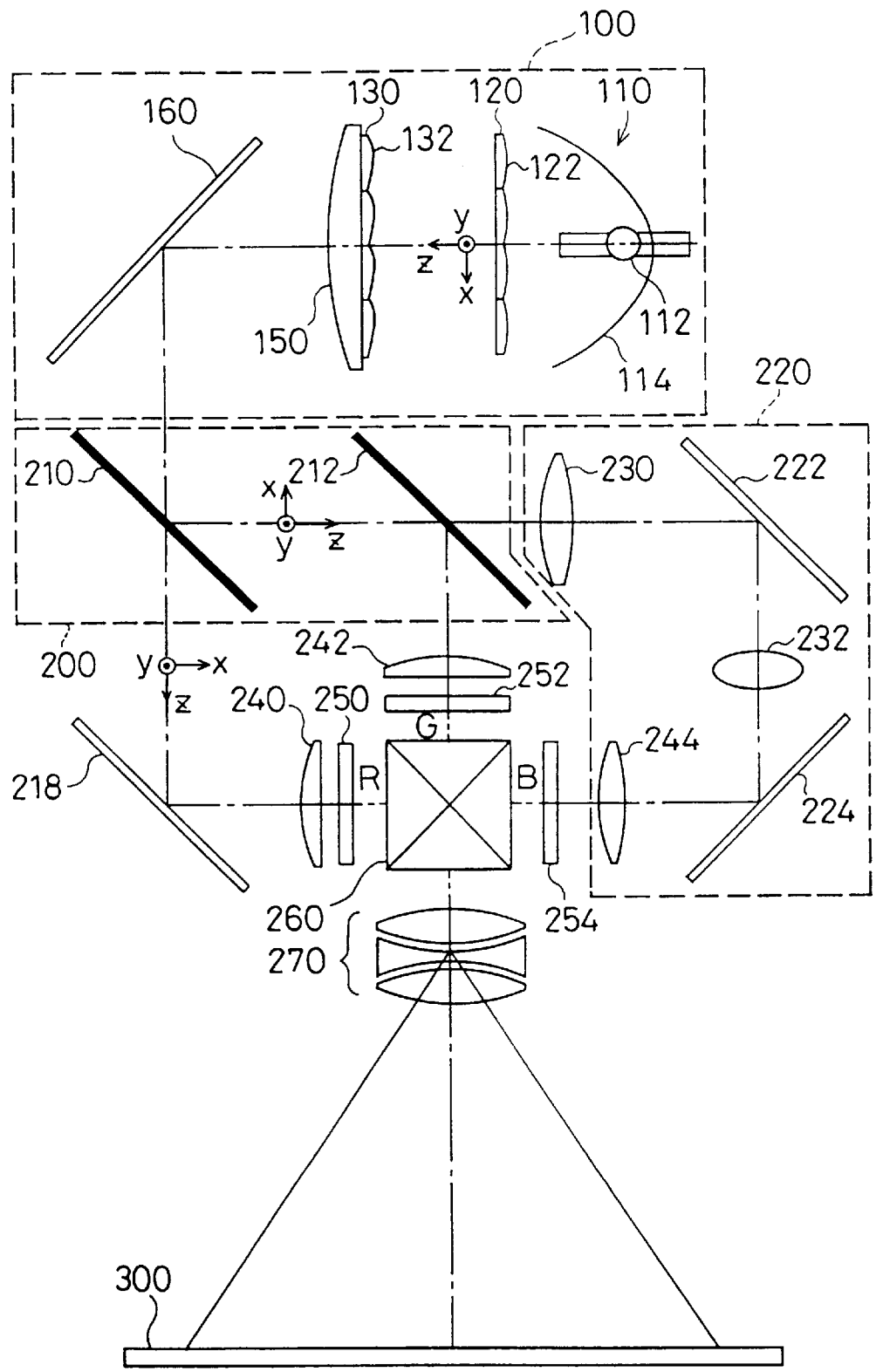
FIG. 5 is a plan view schematically illustrating a main part of a projection display apparatus as a first embodiment according to the present invention.

FIG. 5 is a plan view schematically illustrating a main part of a projection display apparatus as a first embodiment according to the present invention. The projection display apparatus includes: a lighting optical system 100; dichroic mirrors 210 and 212; reflecting mirrors 218, 222, and 224; an entrance lens 230; a relay lens 232; three field lenses 240, 242, and 244; three liquid-crystal light valves (liquid-crystal panels) 250, 252, and 254; a cross dichroic prism 260; and a projection lens system 270.

The lighting optical system 100 includes: a light source 110 for emitting a substantially parallel light flux; a first lens array 120; a second lens array 130; a superposing lens 150; and a reflecting mirror 160. The lighting optical system 100 is an integrator optical system that substantially uniformly causes the three liquid-crystal light valves 250, 252, and 254.

The light source 110 has a light-source lamp 112 used as a radiant light source for emitting a radiant ray of light and a concave mirror 114 for converting the radiant ray of light emitted from the light-source lamp 112 to a substantially parallel light flux. One preferable example of the concave mirror 114 is a parabolic reflector.

Figure 6:
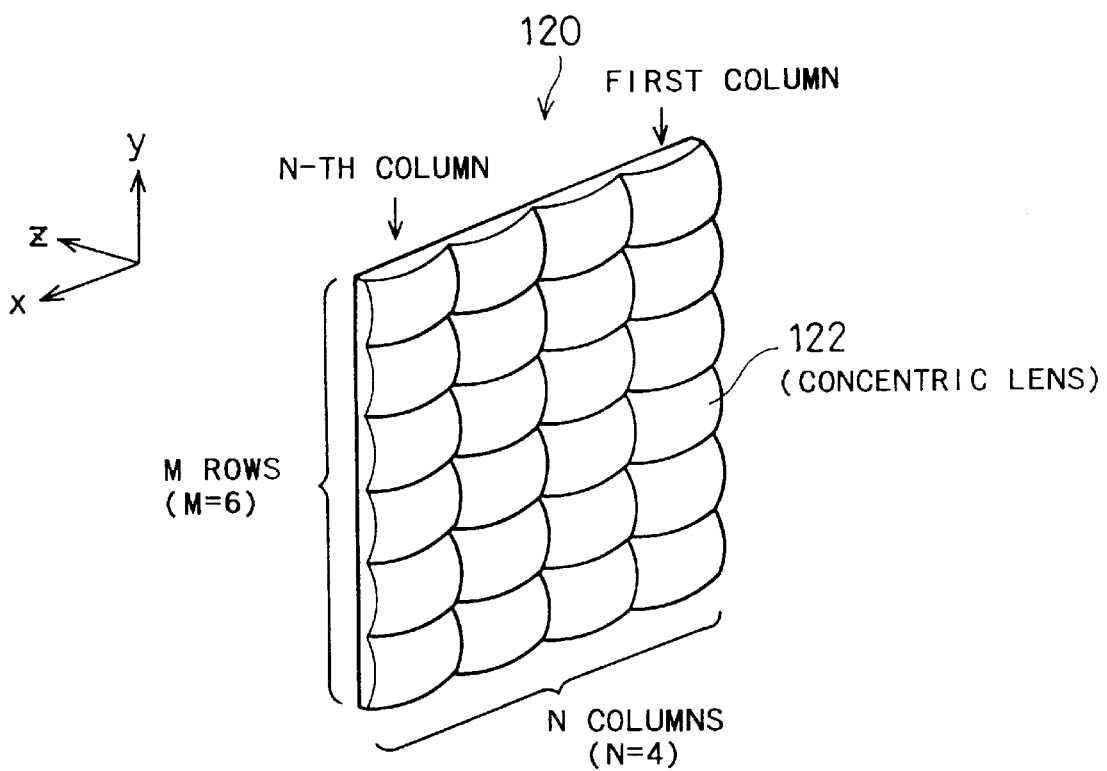
FIG. 6 is a perspective view illustrating the appearance of a first lens array 120.

FIG. 6 is a perspective view illustrating the appearance of the first lens array 120. The first lens array 120 includes small lenses 122 which respectively have a substantially rectangular shape and are arranged in a matrix of M rows and N columns. In this example, M=6 and N=4. The second lens array 130 includes small lenses that are essentially arranged in a matrix of M rows and N columns corresponding to the small lenses 122 of the first lens array 120. The details of the second lens array 130 will be described later. The small lenses 122 divide the light flux emitted from the light source 110 (FIG. 5) into a plurality of (that is, M×N) partial light fluxes and condense the respective partial light fluxes in the vicinity of the second lens array 130. The contour of each small lens 122 seen from the direction z is set to be substantially similar to the shape of a display area on the liquid-crystal light valves 250, 252, and 254. In this embodiment, the aspect ratio (the ratio of the lateral dimension to the vertical dimension) of each small lens 122 is set equal to 4 to 3.

In the projection display apparatus shown in FIG. 5, the parallel light flux emitted from the light source 110 is divided into a plurality of partial light fluxes by the first lens array 120 and the second lens array 130 in the integrator optical system. The partial light fluxes output from the respective small lenses 122 of the first lens array 120 are condensed by means of the small lenses 122, so that images of the light source 110 are focused in corresponding small lenses 132 of the second lens array 130. Namely a number of secondary light source images are formed in the small lenses 132 of the second lens array 130 corresponding to the number of small lenses 122 of the first lens array 120.

The superposing lens 150 has the function of the superposing optical system that superposes and condenses the partial light fluxes output from the respective small lenses 132 of the second lens array 130 on the liquid-crystal light valves 250, 252, and 254, that is, on the areas to be illuminated. One lens array having both the function of the superposing lens 150 and the function of the respective small lenses of the second lens array 130 may be used instead of the two lenses 130 and 150. The reflecting mirror 160 has the function of reflecting the light fluxes output from the superposing lens 150 toward the dichroic mirror 210. The reflecting mirror 160 may be omitted from the structure according to the requirements. The structure of the embodiment enables the respective liquid-crystal light valves 250, 252, and 254 to be illuminated in a substantially uniform manner.

The two dichroic mirrors 210 and 212 have the function of the colored light separation means that separates a ray of white light condensed by the superposing lens 150 into three colored rays of red, green, and blue. The first dichroic mirror 210 transmits a red light component of the white light flux emitted from the lighting optical system 100, while reflecting a blue light component and a green light component. The red light transmitted by the first dichroic mirror 210 is reflected from the reflecting mirror 218, passes through the field lens 240, and eventually reaches the liquid-crystal light valve 250 for red light. The field lens 240 converts each partial light flux output from the second lens array 130 to a light flux parallel to the central axis of the partial light flux. The field lenses 242 and 244 arranged before the other liquid-crystal light valves have the same function. The green light reflected from the first dichroic mirror 210 is reflected again by the second dichroic mirror 212, passes through the field lens 242, and eventually reaches the liquid-crystal light valve 252 for green light. The blue light reflected from the first dichroic mirror 210 is transmitted by the second dichroic mirror 212, passes through the relay lens system including the entrance lens 230, the relay lens 232, and the reflecting mirrors 222 and 224, goes through the field lens 244, and eventually reaches the liquid-crystal light valve 254 for blue light. The relay lens system is used for the blue light component which has the longer optical path than those of the other colored light components, in order to prevent a decrease in utilization efficiency of light. In other words, the relay lens system enables the partial light fluxes entering the entrance lens 230 to be transmitted to the exit lens 244.

Figure 18:
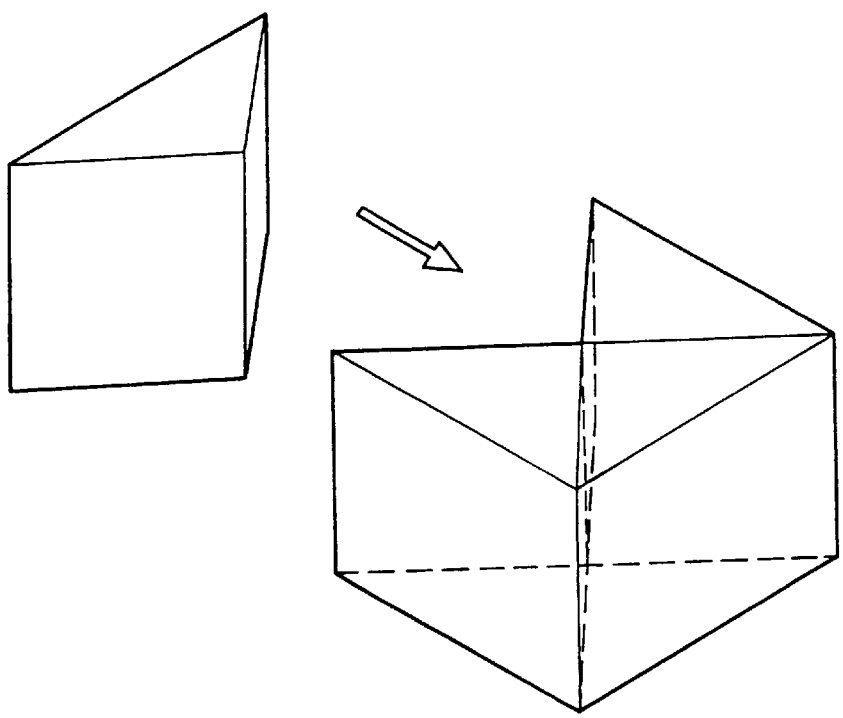
FIG. 18 is a partly decomposed perspective view illustrating a cross dichroic prism 48.
Figure 19A:
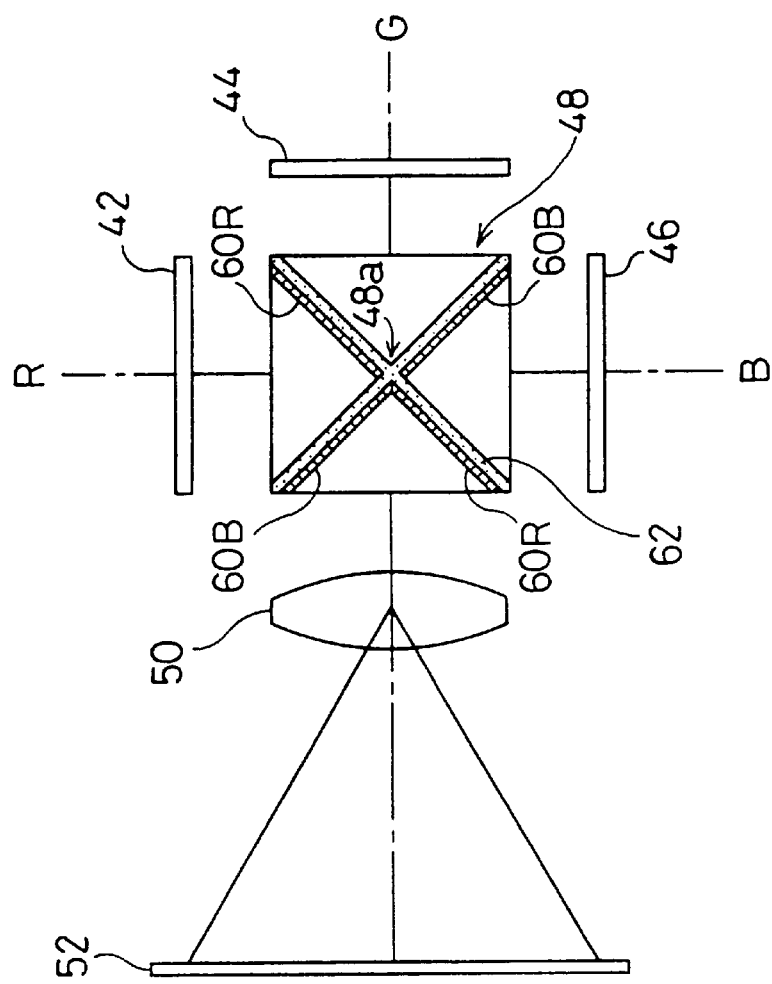
FIGS. 19(A) and 19(B) show a problem arising in the case of utilizing the cross dichroic prism 48.
Figure 19B:
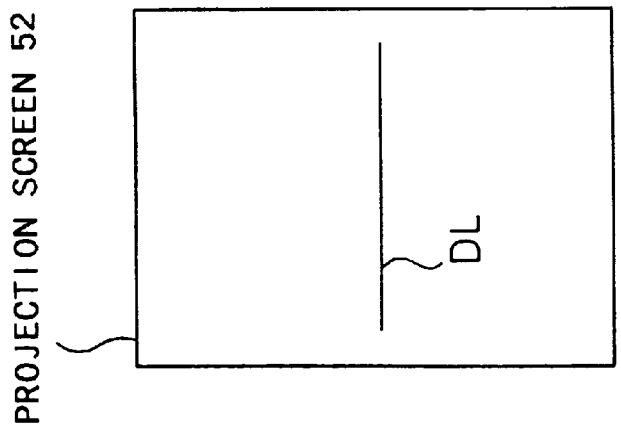

The three liquid-crystal light valves 250, 252, and 254 have the functions of the light modulation meanss that respectively modulate the three colored rays responsive to given image information (a given image signal) to form images. The cross dichroic prism 260 has the function of the colored light combining means that combines the three colored rays and forms a color image. The structure of the dichroic prism 260 is identical with that described in FIGS. 18 and 19. The cross dichroic prism 260 has a dielectric multi-layered film for reflecting red light and another dielectric multi-layered film for reflecting blue light that are arranged in a substantially X shape on an interface of four right-angle prisms. These dielectric multi-layered films combine the three colored rays to produce composite light used for projecting a color image. The composite light generated by the cross dichroic prism 260 is output toward the projection lens system 270. The projection lens system 270 has the function of the projection optical system that projects the composite light on a projection screen 300 to display a color image.

Figure 7A:
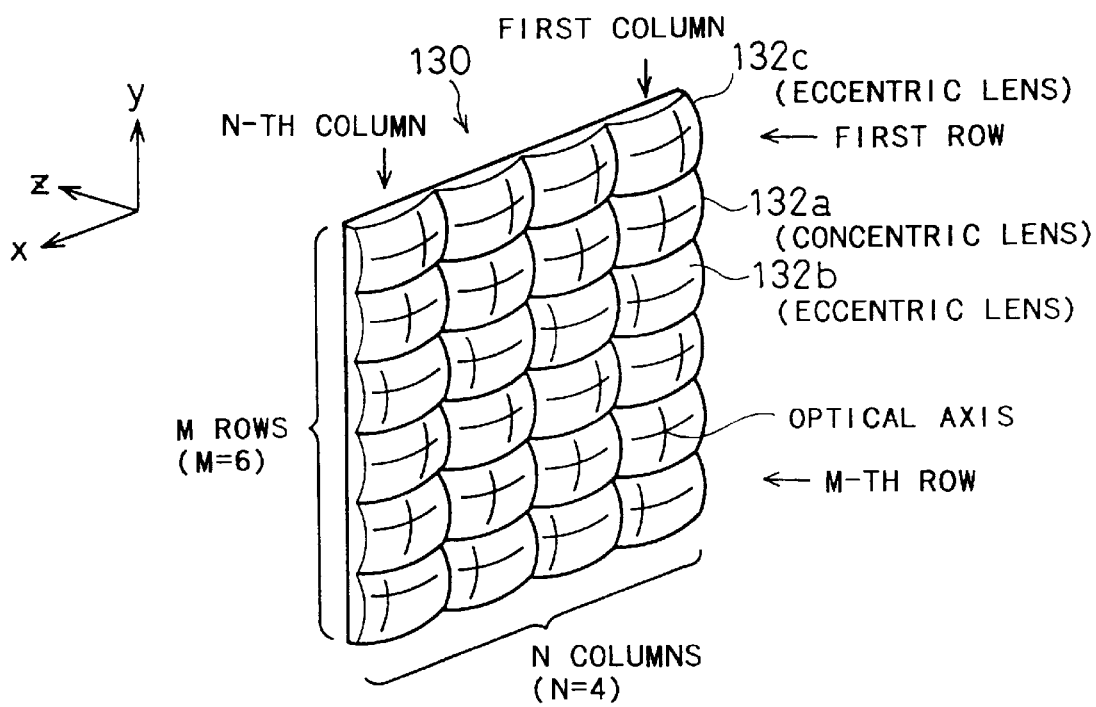
FIGS. 7(A) and 7(B) show a second lens array 130 in the first embodiment.
Figure 7B:
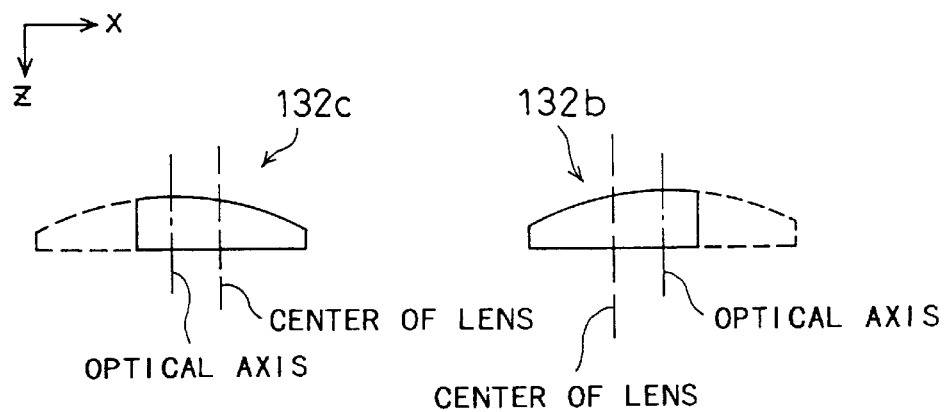

The projection display apparatus of the first embodiment shown in FIG. is characterized by the second lens array 130. FIG. 7 shows the second lens array 130 in the first embodiment. The small lenses 132 of the second lens array 130 include three different types of small lenses 132a, 132b, and 132c having optical axes at different positions. Each row of the small lenses 132 consists of one of the three types of small lenses 132a, 132b, and 132c. Referring to FIG. 7(A), the cross drawn on the surface of each small lens represents the position of the optical axis or the optical center of each small lens. The small lenses 132a constituting the second and the fifth rows of the second lens array 130 have the optical axes on the centers of the respective small lenses 132a. The small lenses 132b constituting the third and the sixth rows have the optical axes shifted in the +x direction from the centers of the respective small lenses 132b. The small lenses 132c constituting the first and the fourth rows have the optical axes shifted in the −x direction from the centers of the respective small lenses 132c. FIG. 7(B) shows exemplified structures of small lenses having shifted optical axes (eccentric lenses), such as the small lenses 132b and 132c. The small lenses 132b and 132c are eccentric lenses that are equivalent to the lenses having the optical axes shifted from the centers of spherical lenses cut at predetermined positions.

Figure 8A:
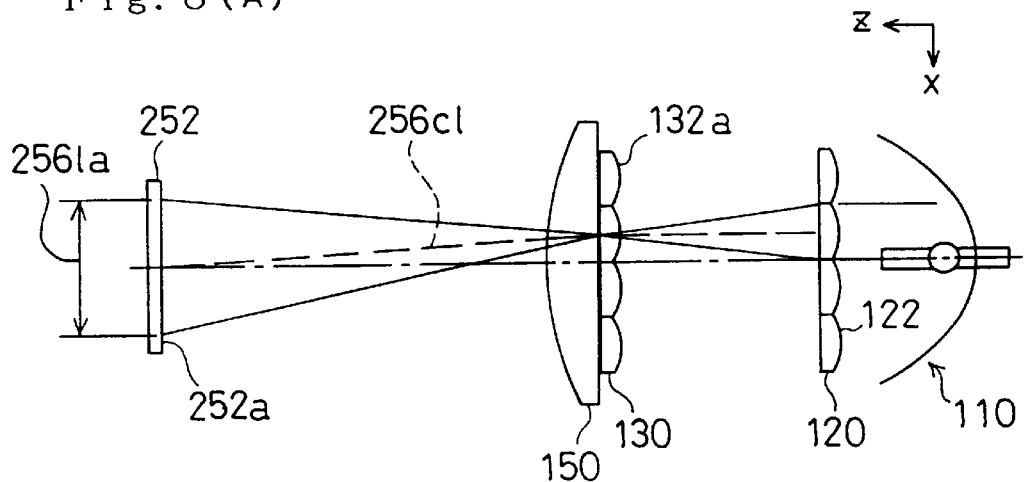
FIGS. 8(A)–8(C) show the function of the second lens array 130.
Figure 8B:
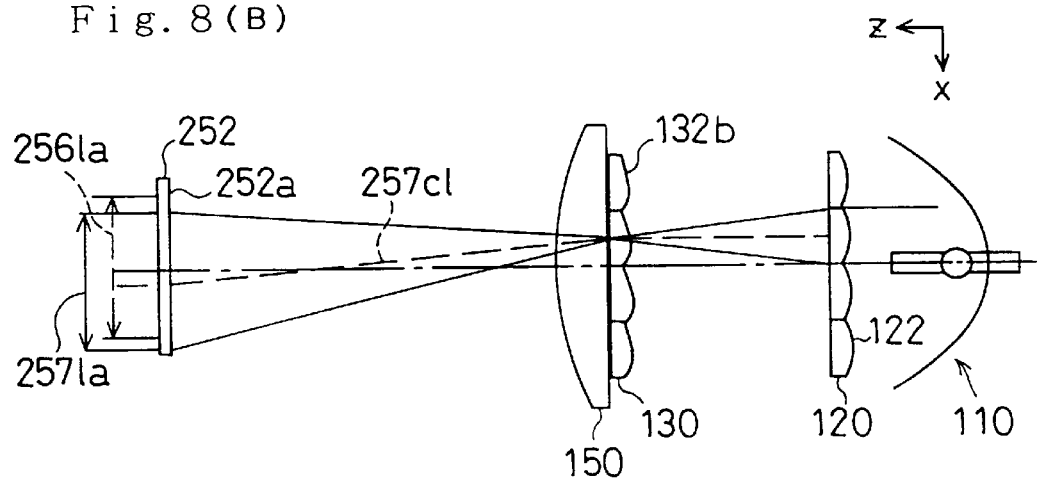
Figure 8C:
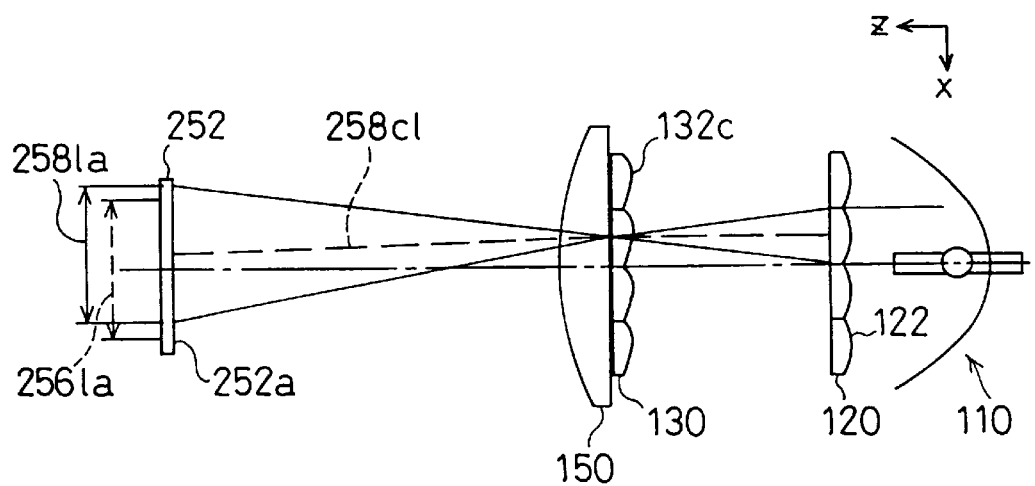

FIG. 8 shows the function of the second lens array 130. FIG. 8(A) is a plan view showing the second row from the top of the second lens array 130, FIG. 8(B) is a plan view showing the third row from the top of the second lens array 130, and FIG. 8(C) is a plan view showing the fourth row from the top of the second lens array 130. For the simplicity of illustration, only the main part on the optical path from the light source 110 to the liquid-crystal light valve 252. The following description regards the second column of the first and the second lens arrays 120 and 130 (FIGS. 6 and 7).

Referring to FIG. 8(A), the parallel light flux emitted from the light source 110 is divided into a plurality of partial light fluxes by the small lenses 122 of the first lens array 120. The partial light flux is condensed by the small lens 122 to be focused as a light source image in the small lens 132a of the second lens array 130. The superposing lens 150 causes the partial light flux output from the small lens 132a to be superposed and condensed on a lighting area 252a, which is the light-entrance surface of the liquid-crystal bulb 252. The small lens 132a has the optical axis on the center of the small lens 132a (see FIG. 7). The partial light flux output from the small lens 132a accordingly has a central axis 256cl that passes through the center of the lighting area 252a, so that an illumination area 256la is illuminated. Referring to FIG. 8(B), the partial light flux output from the small lens 132b on the second column of the second lens array 130 is condensed on the lighting area 252a in the same manner as FIG. 8(A). The small lens 132b, however, has the optical axis shifted in the +x direction (see FIG. 7). The partial light flux output from the small lens 132b accordingly has a central axis 257cl that is shifted in the +x direction from the center of the lighting area 252a, so that an illumination area 257la, which is shifted in the +x direction from the illumination area 256la, is illuminated. Referring to FIG. 8(C), the partial light flux output from the small lens 132c on the second column of the second lens array 130 is condensed on the lighting area 252a in the same manner as FIGS. 8(A) and 8(B). The small lens 132c, however, has the optical axis shifted in the −x direction (see FIG. 7). The partial light flux output from the small lens 132c accordingly has a central axis 258cl that is shifted in the −x direction from the center of the lighting area 252a, so that an illumination area 258la, which is shifted in the −x direction from the illumination area 256la, is illuminated. The partial light fluxes on the fifth, the sixth, and the first rows of the second lens array 130 respectively have the optical paths identical with those of FIGS. 8(A), 8(B), and 8(C). As shown in FIGS. 8(A), 8(B), and 8(C), the partial light fluxes passing through the small lenses arranged on the same column are superposed on the three different illumination areas 256la, 257la, and 258la by the three different types of small lenses 132a, 132b, and 132c of the second lens array and the superposing lens 150 to illuminate the lighting area 252a. The respective central axes 256cl, 257cl, and 258cl of the partial light fluxes pass through the lighting area 252a at the different positions relative to the center of the lighting area 252a.

Figure 9:
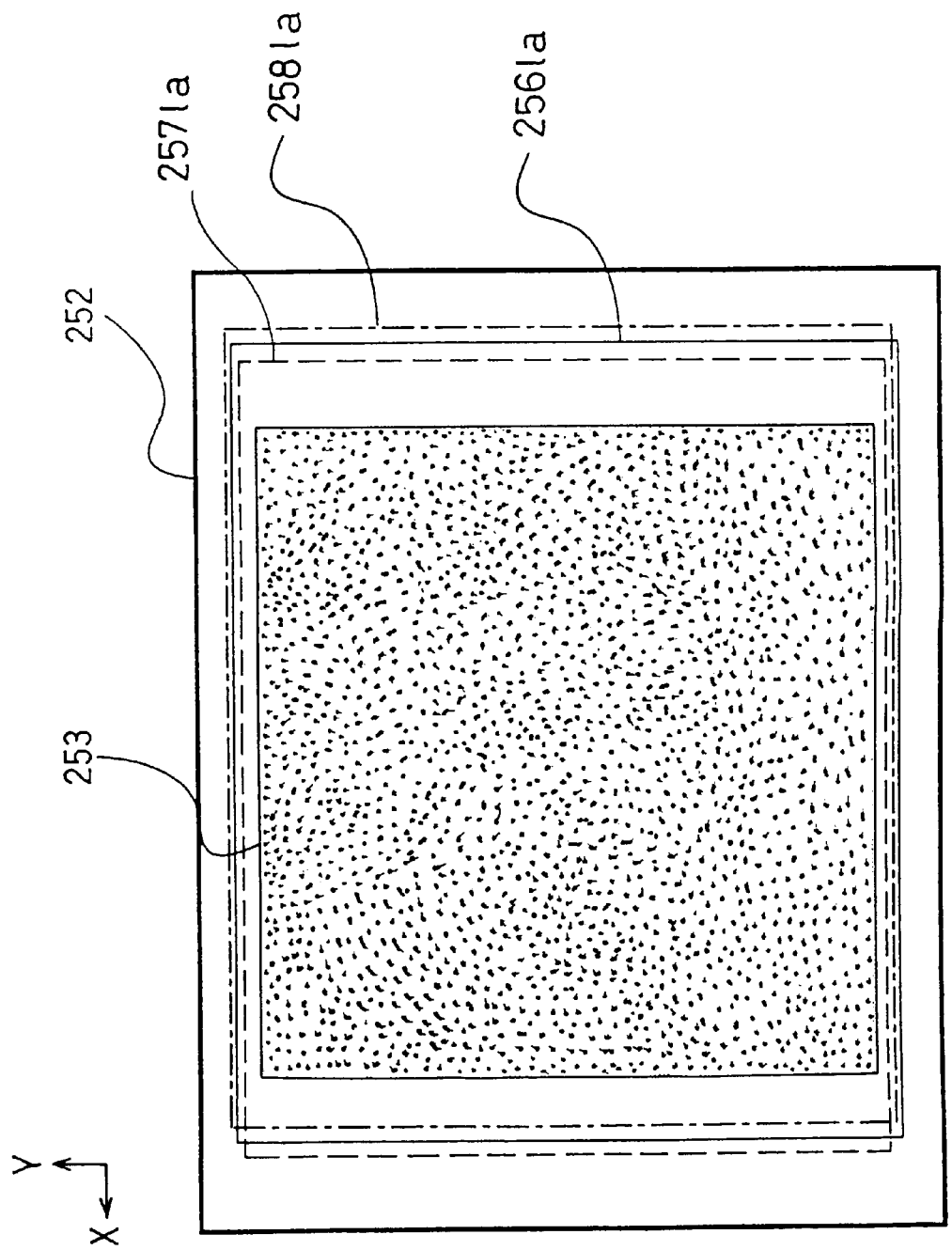
FIG. 9 conceptually shows the state in which the partial light fluxes by the first and the second lens arrays 120 and 130 are superposed on a liquid-crystal light valve 252.

FIG. 9 conceptually shows the state in which the partial light fluxes by the first and the second lens arrays 120 and 130 are superposed on the liquid-crystal light valve 252. In this drawing, the liquid-crystal light valve 252 is seen from the side of the superposing lens 150. The illumination area 256la by the partial light fluxes passing through the small lenses 132a is shown by the solid line, the illumination area 257la by the partial light fluxes passing through the small lenses 132b is shown by the broken line, and the illumination area 258la by the partial light fluxes passing through the small lenses 132c is shown by the one-dot chain line. Although the illumination areas 256la, 257la, and 258la have deviations in the y direction in FIG. 9, these deviations are only for the purpose of clarifying their positional differences. In the actual state, there is substantially no deviation in the y direction. As clearly seen in FIG. 9, the illumination area 257la is shifted in the +x direction from the illumination area 256la, whereas the illumination area 258la is shifted in the −x direction from the illumination area 256la. The positional difference among the illumination areas 256la, 257la, and 258la in the x direction causes the unevenness of illumination on both ends of the liquid-crystal light valve 252. No significant problem, however, arises since an effective area 253 actually used for the projection is smaller in size than the contour of the liquid-crystal light valve 252.

Figure 10:
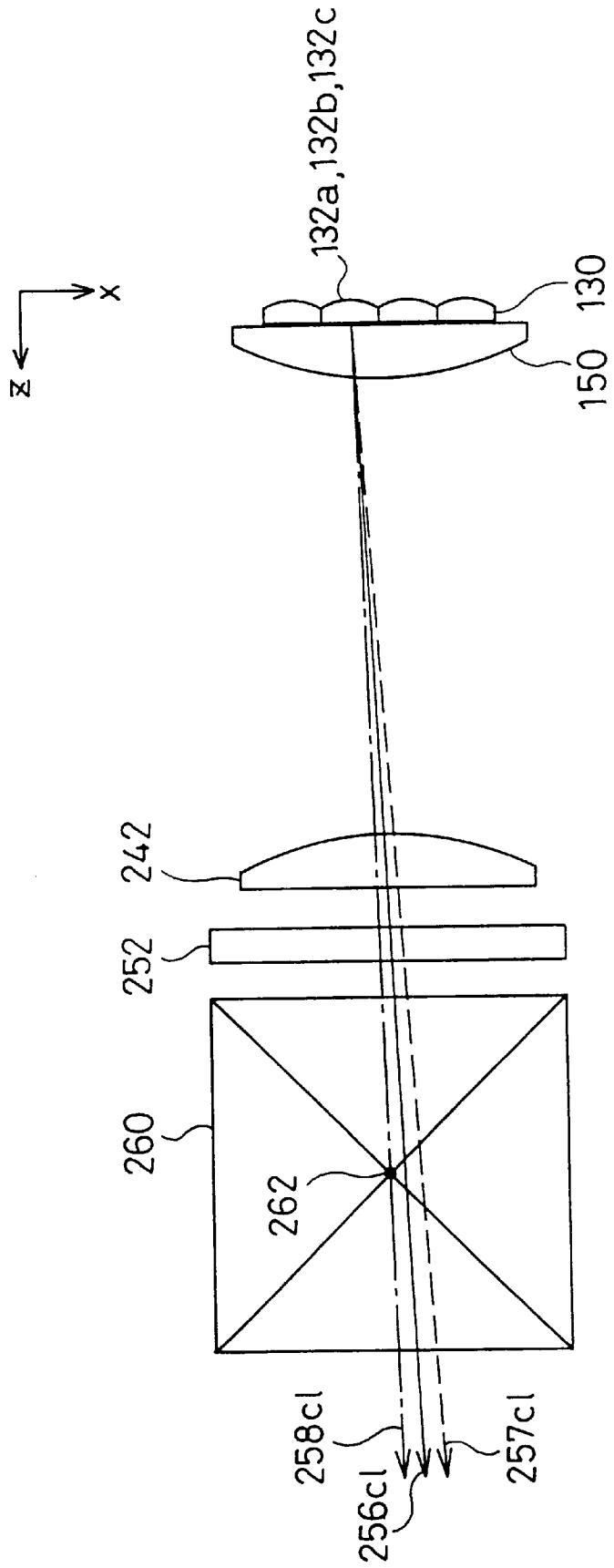
FIG. 10 shows the state in which partial light fluxes output from small lenses 132a, 132b, and 132c pass through a cross dichroic prism 260.

FIG. 10 shows the state in which the partial light fluxes output from the small lenses 132a, 132b, and 132c pass through the cross dichroic prism 260. For the better understanding, parts not required for description are either omitted or simplified. The central axis 256cl of the partial light flux output from the small lens 132a on the second row and the second column of the second lens array 130, the central axis 257cl of the partial light flux output from the small lens 132b on the third row and the second column, and the central axis 258cl of the partial light flux output from the small lens 132c on the fourth row and the second column pass through the cross dichroic prism 260 at different positions relative to a central axis 262 of the cross dichroic prism 260. As described previously in the first principle, the positional difference among the central axes of the partial light fluxes passing through the cross dichroic prism 260 relative to the central axis 262 of the cross dichroic prism 260 causes dark lines to be formed at different positions. This prevents the dark lines formed by the respective partial light fluxes passing through the M small lenses arranged on the same column from being condensed on one place, and thereby makes the dark lines sufficiently inconspicuous.

Figure 11A:
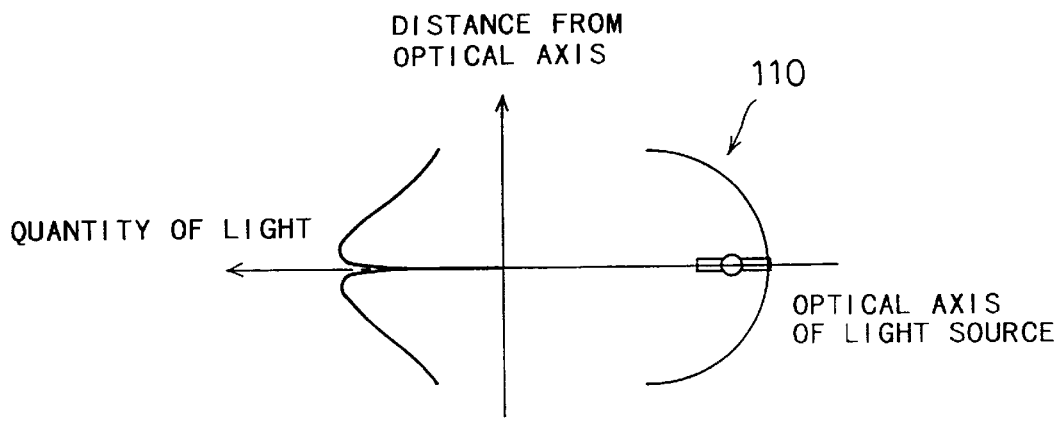
FIGS. 11(A) and 11(B) show the relationship between the position of the optical axis of the small lens on each row of the second lens array 130 and the quantity of light of the partial light flux passing through each small lens.
Figure 11B:
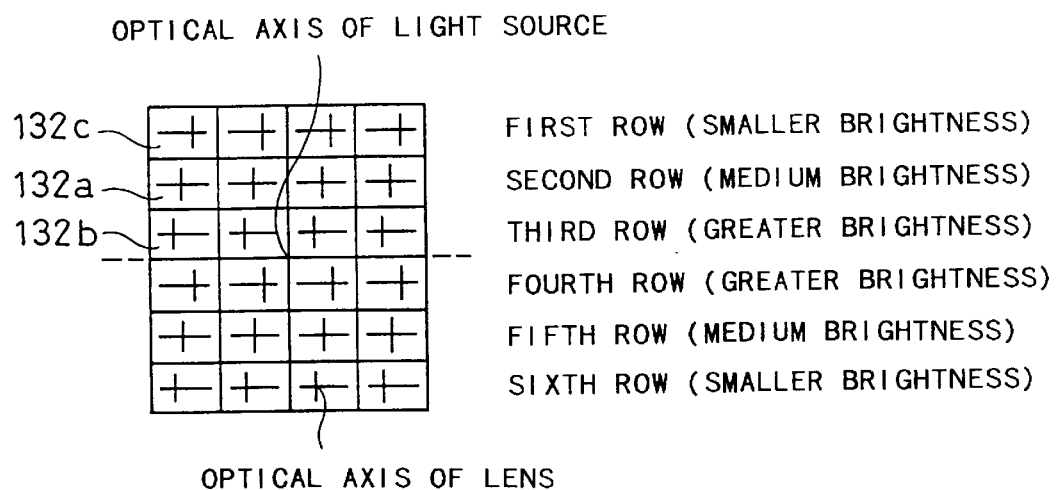

The following describes the arrangement of small lenses having optical axes at different positions in the second lens array 130. FIG. 11 shows the relationship between the position of the optical axis of the small lens on each row of the second lens array 130 and the quantity of light of the partial light flux passing through each small lens. FIG. 11(A) shows a distribution of the quantity of light emitted from the light source 110. FIG. 11(B) is a front view showing the second lens array 130 from the side of the light source 110. Referring to FIG. 11(A), the light source 110 generally has the brightest portion in the vicinity of the center of the optical axis of the light-source lamp 112, and the brightness decreases with an increase in distance apart from the center of the optical axis. When it is assumed that the brightness of the partial light fluxes passing through the small lenses on the second and the fifth rows of the second lens array 130 is medium, the brightness on the third and the fourth rows is greater, whereas the brightness on the first and the sixth rows is smaller as shown in FIG. 11(B).

As described previously, among the partial light fluxes passing through the M small lenses arranged on the same column of the second lens array 130, those passing through the small lenses having optical axes at the same position form dark lines at the same position on the screen. In this embodiment, the set of the small lenses 132c on the first and the fourth rows, the set of the small lenses 132a on the second and the fifth rows, and the set of the small lenses 132b on the third and the sixth rows respectively cause dark lines to be formed at the same positions on the screen. The difference in total quantity of light among the partial light fluxes passing through the respective sets of the small lenses leads to the difference in degree of darkness among the three dark lines formed on the screen. The human's eyes have relatively high discriminating power based on the relative comparison. The difference in degree of darkness among a plurality of dark lines accordingly makes the dark lines rather conspicuous.

The positions of the optical axes of the respective small lenses are determined to equalize a total quantity of light of the partial light fluxes passing through each set of small lenses, which have the optical axes at the same position, among the M small lenses arranged on the same column of the second lens array 130. This enables the three dark lines formed by the partial light fluxes passing through the respective sets of small lenses to have the substantially identical degree of darkness.

In this embodiment, the optical axes of the small lenses included in the respective sets, that is, the set of the first and the fourth rows, the set of the second and the fifth rows, and the set of the third and the sixth rows, are arranged at three different positions, in the −x direction, on the center of the lens, and in the +x direction as shown in FIG. 11(B). This arrangement causes the dark lines formed by the partial light fluxes passing through the M small lenses arranged on the same column to be divided into three different places and have the equivalent degree of darkness, thereby making the dark lines sufficiently inconspicuous.

The positional shifts of the optical axes of the small lenses 132b and 132c may be calculated from the geometrical relations of the second lens array 130, the superposing lens 150, the field lenses 240, 242, and 244, the liquid-crystal light valves 250, 252, and 254, and the central axis 262 of the cross dichroic prism 260, or may be obtained experimentally. It is preferable that the positions of the optical axes of the small lenses 132b and 132c, that is, the small lenses having the optical axes shifted from the center of the lens, are determined to cause the dark lines formed by the partial light fluxes passing through the small lenses 132b and 132c to exist between the dark lines formed by the partial light fluxes passing through the small lenses 132a on the second and the fifth rows, that is, the small lenses having the optical axes on the center of the lens. The dark lines formed by the partial light fluxes passing through the small lenses having the optical axes shifted from the center of the lens (the small lenses 132b and 132c) are preferably to be disposed in the middle of the dark lines formed by the partial light fluxes passing through the small lenses having the optical axes on the center of the lens (the small lenses 132a). This structure maximizes the interval between the dark lines and prevents the dark lines from being overlapped.

In the structure of the embodiment, the position of the optical axis of the small lens is changed on each row of the lens array. Another structure may also be applicable as long as the structure prevents the dark lines formed by the partial light fluxes passing through the M small lenses arranged on the same column from being converged on one place.

Figure 12:
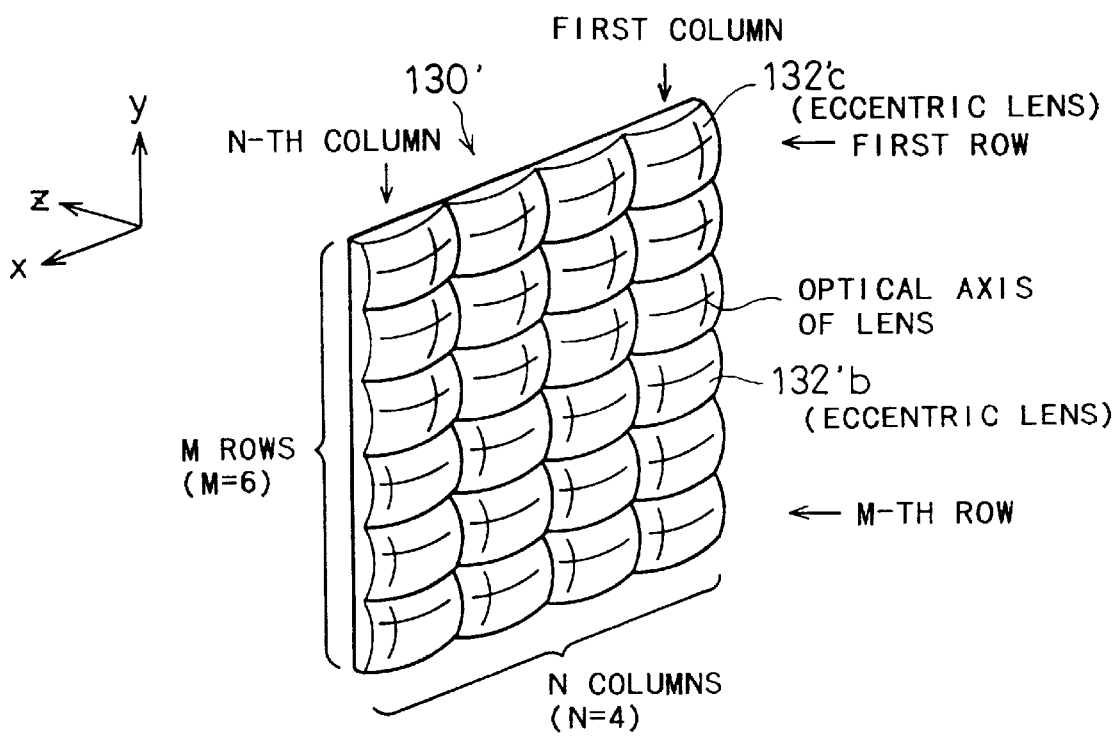
FIG. 12 shows another second lens array 130' having different structure from that of the second lens array 130 shown in FIG. 7.

FIG. 12 shows another second lens array 130' having different structure from that of the second lens array 130 shown in FIG. 7. The second lens array 130' includes M rows of small lenses that are divided by the center of the rows into two sections, an upper section and a lower section. The upper section consists of small lenses 132'c having optical axes shifted in the −x direction from the center of the lens, whereas the lower section consists of small lenses 132'b having optical axes shifted in the +x direction from the center of the lens. The second lens array 130' of this structure is applied to the lighting optical system 100 shown in FIG. 5 in the projection display apparatus. In this case, the dark lines formed by the partial light fluxes passing through the M small lenses arranged on the same column are divided into two different places. Although the second lens array 130' causes the less number of divisions of dark lines than the second lens array 130, this structure also makes the dark lines sufficiently inconspicuous. The second lens array 130' includes two different types of small lenses with optical axes at different positions, which are divided in the direction of rows into the two sections, the upper section and the lower section. This simple structure enables the second lens array 130' to be manufactured more readily than the second lens array 130.

B. Second Embodiment

Figure 13:
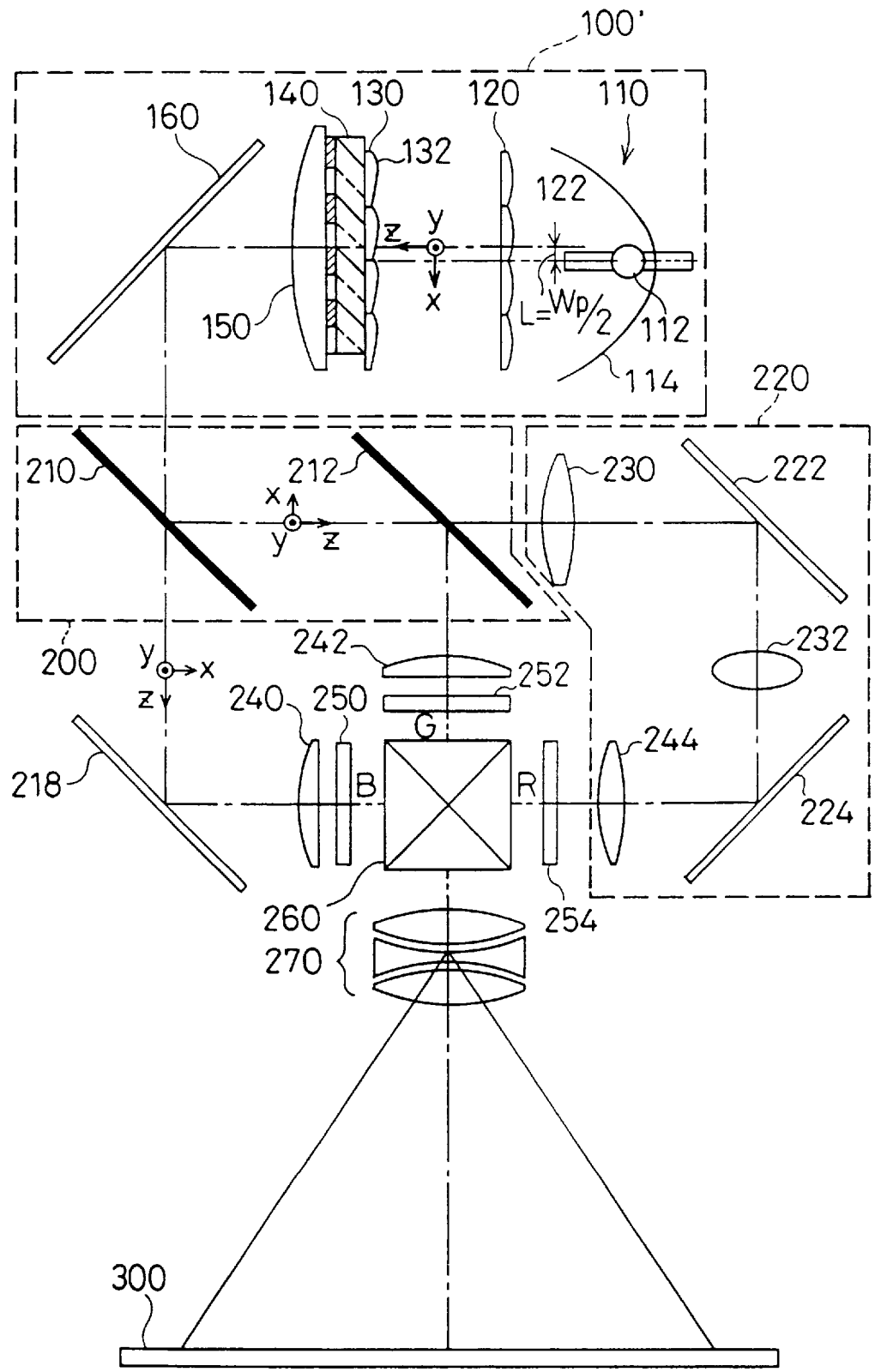
FIG. 13 illustrates another projection display apparatus as a second embodiment according to the present invention.

FIG. 13 illustrates another projection display apparatus as a second embodiment according to the present invention. The primary difference of the second embodiment from the first embodiment is that a lighting optical system 100' includes a polarizing element 140 interposed between the second lens array 130 and the superposing lens 150. The other constituents of the second embodiment are identical with those of the first embodiment. The lighting optical system 100' emits predetermined polarized light, but there is no difference in main functions. Like the first embodiment, the second lens array 130 may be replaced by the second lens array 130' shown in FIG. 12. The following describes the functions different from those of the first embodiment.

Figure 14A:
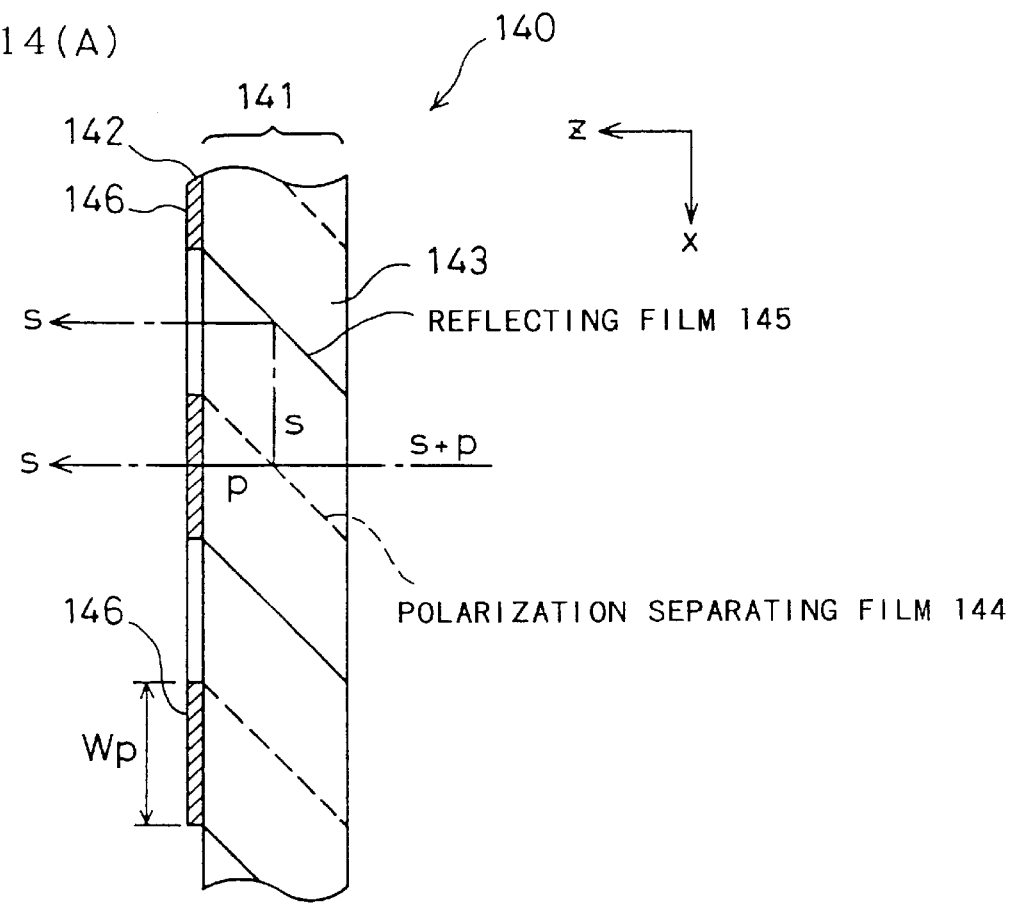
FIGS. 14(A) and 14(B) illustrate structure of a polarizing element 140.
Figure 14B:
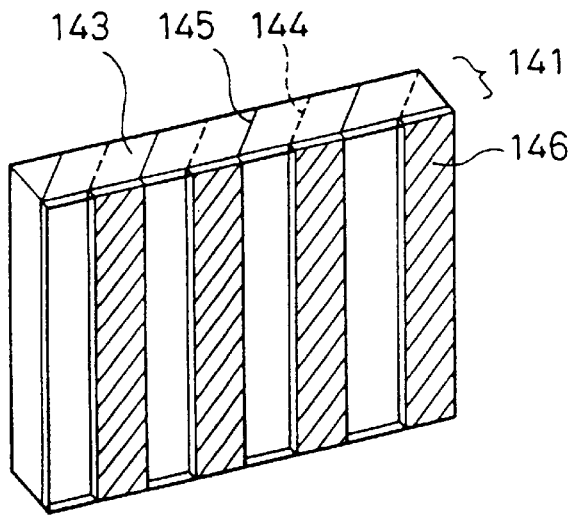

FIG. 14 illustrates structure of the polarizing element 140 (FIG. 13). The polarizing element 140 includes a polarization beam splitter array 141 and a selective phase difference plate 142. The polarization beam splitter array 141 includes a plurality of columnar translucent members 143 having a parallelogrammatic cross section, which are bonded to one another. Polarization separating films 144 and reflecting films 145 are formed alternately on the interfaces of the translucent members 143. In order to enable the polarization separating film 144 and the reflecting film 145 to be arranged alternately, the polarization beam splitter array 141 is manufactured by bonding a plurality of sheet glasses with these films formed thereon and cutting the bonded sheet glasses slantly at a predetermined angle.

The light of random polarizing directions passing through the first and the second lens arrays 120 and 130 is divided by the polarization separating film 144 into s-polarized light and p-polarized light. The p-polarized light passes through the polarization separating film 144, whereas the s-polarized light is reflected by the polarization separating film 144 in such a manner that the angle of the incident ray and a perpendicular line at the incident point of the s-polarized light into the polarization separating film 144 is symmetrical with the angle of the reflected ray and the perpendicular line (the rule of reflection). The s-polarized light reflected from the polarization separating film 144 is reflected again by the reflecting film 145 according to the rule of reflection and is then output to be substantially parallel to the p-polarized light passing through the polarization separating film 144. The selective phase difference plate 142 is an optical element having λ/2 phase difference layers 146 disposed on the light-exit surfaces of the light passing through the polarization separating films 144. There are no λ/2 phase difference layers on the light-exit surfaces of the light reflected from the reflecting films 145. The λ/2 phase difference layer 146 accordingly converts the p-polarized light transmitted by the polarization separating film 144 to s-polarized light. As a result, the light fluxes of random polarizing directions entering the polarizing element 140 are mostly converted to s-polarized light. In accordance with another possible structure, the selective phase difference plate 142 may have λ/2 phase difference layers 146 disposed on the light-exit surfaces of the light reflected from the reflecting films 145 to convert the s-polarized light to p-polarized light.

As clearly shown in FIG. 14(A), the position of the center of the s-polarized light emitted from one polarization separating film 144 of the polarizing element 140 (that is, the position of the center when the two rays of s-polarized light are regarded as one set of light flux) is deviated in the x direction from the center of the incident random light flux (s-polarized light+p-polarized light). The shift is equal to half a width Wp of the λ/2 phase difference layer 146 (that is, half the width of the polarization separating film 144 in the x direction). As shown in FIG. 13, the optical axis of the light source 110 (shown by the two-dot chain line) is accordingly shifted from the system optical axis (shown by the one-dot chain line) after the polarizing element 140 by a distance equal to Wp/2.

In the first embodiment (FIG. 5), the partial light flux is condensed by each small lens 122 of the first lens array 120 to be focused as an image of the light source 110 in the corresponding small lens 132 of the second lens array 130. In the second embodiment, on the other hand, it is preferable that a light source image is focused in the vicinity of the polarization separating film 144 (FIG. 14) of the polarizing element 140, in order to enable the polarizing element 140 to effectively utilize each partial light flux output from the second lens array 130.

Figure 15:
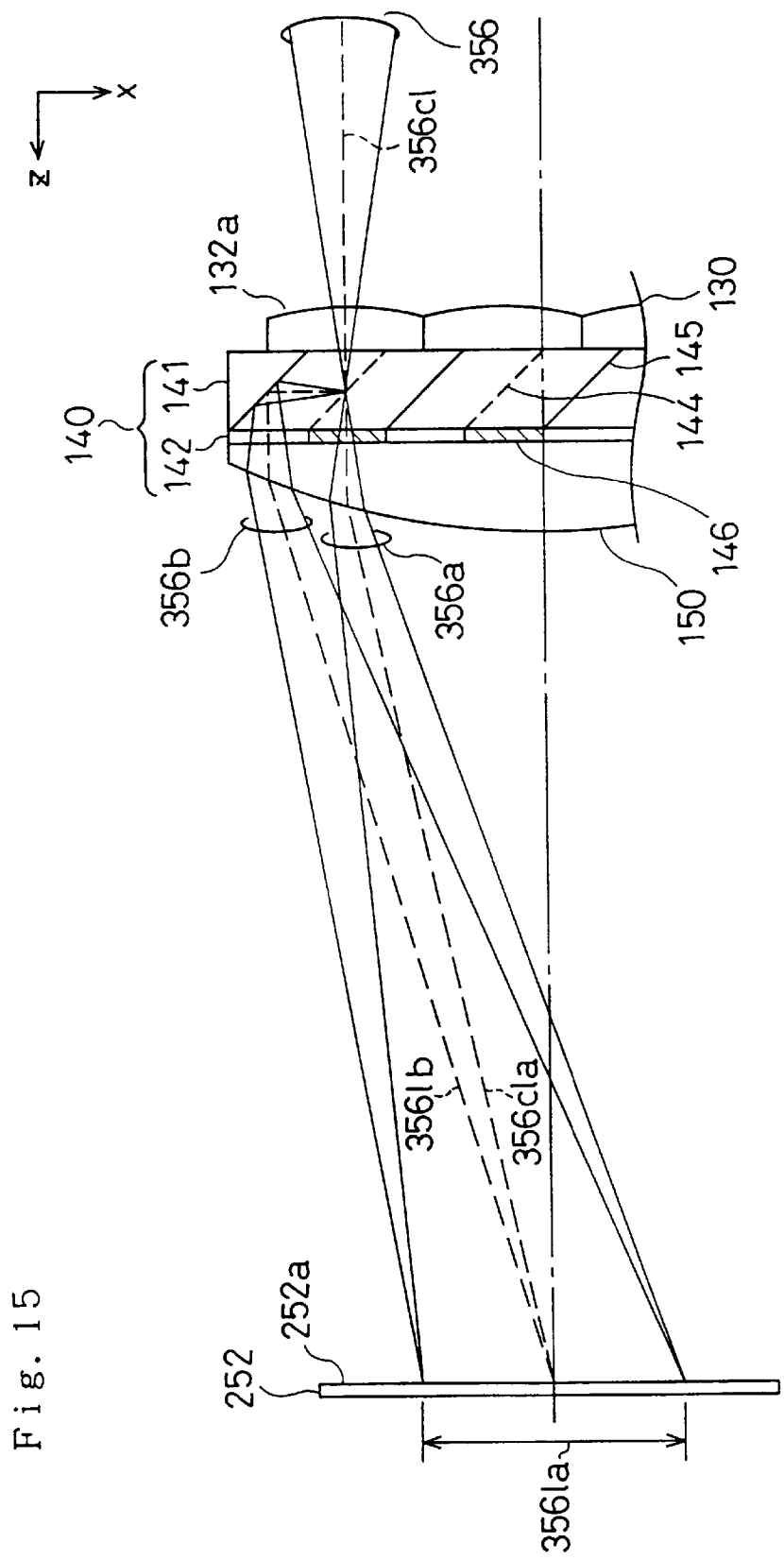
FIG. 15 shows the function of the second lens array 130 in the second embodiment.
Figure 16:
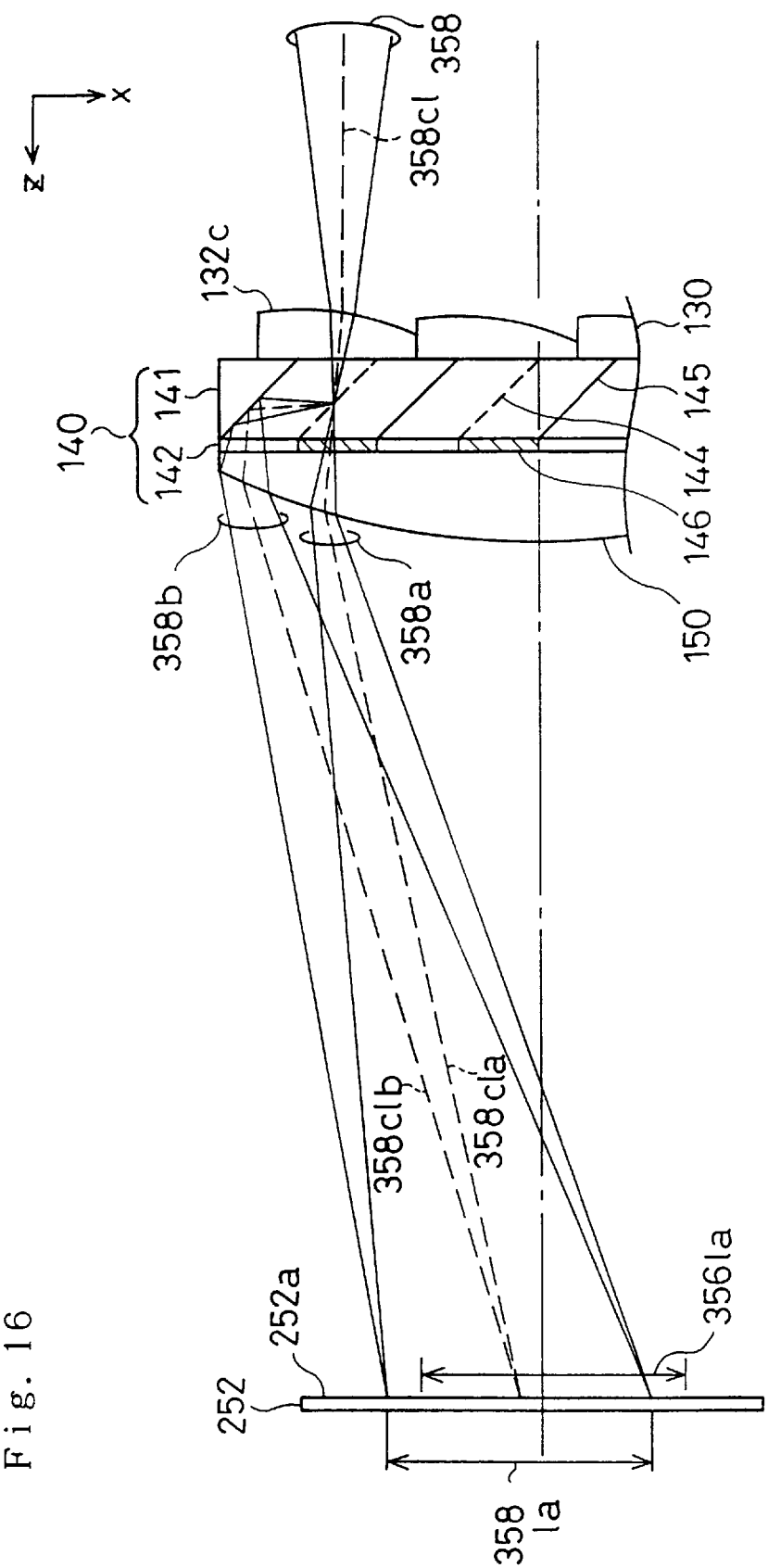
FIG. 16 shows the function of the second lens array 130 in the second embodiment.
Figure 17:
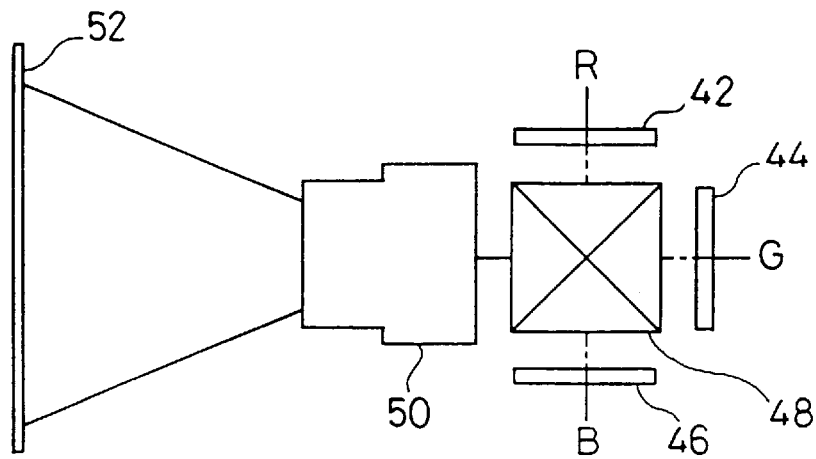
FIG. 17 conceptually illustrates a main part of a projection display apparatus.

FIGS. 15 and 16 shows the function of the second lens array 130 (FIG. 7) in the second embodiment. FIG. 15 shows the optical path of the partial light flux passing through the small lens 132a on the second row and the first column of the second lens array 130. FIG. 16 shows the optical path of the partial light flux passing through the small lens 132c on the fourth row and the first column of the second lens array 130. Referring to FIG. 15, a partial light flux 356 that has a central axis 356cl parallel to the system optical axis and is output from the small lens 122 on the second row and the first column of the first lens array 120, which is not illustrated here, is condensed by the small lens 122 on the polarization separating film 144. A partial light flux 356a transmitted by the polarization separating film 144 is condensed by the superposing lens 150 to illuminate the lighting area 252a, which is the light-entrance surface of the liquid-crystal light valve 252. A partial light flux 358b reflected from the polarization separating film 144 and further from the reflecting film 145 also illuminates the lighting area 252a. The small lens 132a has the optical axis on the center of the lens (see FIG. 7). The partial light flux output from the small lens 132a enters the polarizing element 140 in such a manner that the central axis 356cl of the partial light flux is parallel to the system optical axis. The two partial light fluxes 356a and 356b output from the polarizing element 140 illuminate an illumination area 356la in such a manner that central axes 356cla and 356dlb of these partial light fluxes 356a and 356b pass through the center of the lighting area 252a.

In the same manner as FIG. 15, referring to FIG. 16, a partial light flux 358 that has a central axis 358cl parallel to the system optical axis and is output from the small lens 122 on the fourth row and the first column of the first lens array 120 is condensed by the small lens 122 on the polarization separating film 144. A partial light flux 358a transmitted by the polarization separating film 144 is condensed by the superposing lens 150 to illuminate the lighting area 252a. A partial light flux 356b reflected from the polarization separating film 144 and further from the reflecting film 145 also illuminates the lighting area 252a. The small lens 132c has the optical axis shifted in the −x direction from the center of the lens (see FIG. 7). The partial light flux output from the small lens 132c enters the polarizing element 140 in such a manner that the central axis 358cl of the partial light flux is inclined in the direction away from the system optical path relative to the course of the light. The two partial light fluxes 358a and 358b output from the polarizing element 140 illuminate an illumination area 358la in such a manner that central axes 358cla and 358clb of these partial light fluxes 358a and 358b are shifted in the −x direction from the center of the lighting area 252a.

Like in the first embodiment, in the second embodiment, the small lenses 132a, 132b, and 132c having the optical axes at different positions change the illuminating position (the superposing position) of the partial light fluxes output from the small lenses arranged on the same column of the second lens array on the liquid-crystal light valves 250, 252, and 254. This structure effectively prevents the dark lines formed by the respective partial light fluxes passing through the M small lenses arranged on the same column from being concentration on one place and thereby makes the dark lines sufficiently inconspicuous.

The liquid-crystal light valves 250, 252, and 254 generally have polarizing planes on their light-entrance surfaces. The liquid-crystal light valves 250, 252, and 254 accordingly modulate only predetermined polarized light, whereas the other polarized light is lost as useless light fluxes. The structure of the second embodiment causes the light flux output from the polarizing element 140 to be identical with the predetermined polarized light utilized in the liquid-crystal light valves 250, 252, and 254. Compared with the first embodiment, the second embodiment thus enhances the utilization efficiency of light in the projection display apparatus.

Like in the first embodiment, in the second embodiment, the positional shifts of the optical axes of the small lenses 132b and 132c may be calculated from the geometrical relations of the second lens array 130, the polarizing element 140, the superposing lens 150, the field lenses 240, 242, and 244, the liquid-crystal light valves 250, 252, and 254, and the central axis 262 of the cross dichroic prism 260, or may be obtained experimentally. In the second embodiment, the polarizing element 140 converts part of the partial light flux passing through the second lens array to the partial light flux shifted in the direction of rows by Wp (see FIG. 14). This halves the interval between the partial light fluxes in the direction of rows. It is accordingly preferable that the positions of the optical axes of the small lenses 132b and 132c, that is, the small lenses having the optical axes shifted from the center of the lens, are determined to cause the dark lines formed by the partial light fluxes passing through the small lenses having the optical axes shifted from the center of the lens (the small lenses 132b and 132c) to be disposed in the middle of the dark lines formed at the ½ intervals by the partial light fluxes passing through the small lenses 132a on the second and the fifth rows, that is, the small lenses having the optical axes on the center of the lens.

The present invention is not restricted to the above embodiments or modes, but there may be many modifications, changes, and alterations without departing from the scope or spirit of the main characteristics of the present invention. Some possible modifications are given below.

In the second lens array, the respective rows or the respective sets of rows may have optical centers (optical axes) at different positions in the direction of rows. In another example, only one row or one set of rows may have the optical axis at a different position. In the above embodiments, the light flux from the light source is divided into a plurality of light fluxes arranged in a matrix. The present invention is also applicable to the case in which the light flux is divided into a plurality of light fluxes at least arranged substantially on the same column. It is accordingly required that at least part of the small lenses among at least one column of small lenses substantially arranged in a predetermined direction of columns have the optical center at a different position from that of the optical center of the other small lenses. In this case, the illuminating position (the illumination area) on the lighting area by the partial light fluxes passing through the part of the small lenses is different from the illuminating position by the partial light fluxes passing through the other small lenses. This makes the position of the partial light fluxes passing through the at least part of the small lenses relative to the central axis of the cross dichroic prism different from the position of the partial light fluxes passing through the other small lenses and thereby divides the dark lines into different positions. This accordingly makes the dark lines formed due to the cross dichroic prism inconspicuous.

The projection display apparatus is accordingly required to have the dividing and superposing optical system that divides a light flux into a plurality of partial light fluxes, which are arranged on at least one column and divided substantially in the direction corresponding to the central axis of the colored light combining means, and superposes the plurality of partial light fluxes on the light modulation meanss. The dividing and superposing optical system may have an illuminating position changing means which shifts an optical path regarding part of the light fluxes among one column of the partial light fluxes from an optical path regarding the other partial light fluxes, in order to shift an illumination area on the light modulation means illuminated with the part of the light fluxes from an illumination area illuminated with the other partial light fluxes in a direction different from the direction corresponding to the central axis of the colored light combining means.

All the above embodiments regard the transmission-type projection display apparatuses. The present invention is, however, also applicable to reflection-type projection display apparatuses. The 'transmission-type' implies that the light modulation means, such as the liquid-crystal light valve, transmits light, whereas the 'reflection-type' implies that the light modulation means reflects light. In the reflection-type projection display apparatus, the cross dichroic prism is used both as the colored light separation means which separates white light into three colored rays of red, green, and blue and as the colored light combining means which recombines the modulated three colored rays and emits the composite light in a predetermined direction. The reflection-type projection display apparatus to which the present invention is applied has similar effects to those of the transmission-type projection display apparatus.

The lighting optical system of the present invention is applicable to a variety of projection display apparatuses. The projection display apparatus of the present invention may be used to project and display images output from a computer or images output from a video cassette recorder on a screen.

What is claimed is:

1. A lighting optical system for emitting light for use in a projection display apparatus comprising: colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and a projection means which projects the composite light output from the colored light combining means on a projection surface, the lighting optical system comprising:

a dividing and superposing optical system that divides a light flux into a plurality of partial light fluxes, which are arranged in directions of columns and rows, and superposes the plurality of partial light fluxes, the columns being substantially parallel to the central axis of the colored light combining means, the rows being substantially perpendicular to the direction of columns, wherein the dividing and superposing optical system is constructed to shift, in the direction of rows, an illumination area on each light modulation means illuminated with part of the partial light fluxes among the partial light fluxes on an identical column from an illumination area illuminated with the other partial light fluxes among the partial light fluxes on the identical column.

2. A lighting optical system in accordance with claim 1, wherein the dividing and superposing optical system comprises:

a first lens array having a plurality of small lenses arranged in the directions of columns and rows; and a second lens array having a plurality of small lenses respectively arranged corresponding to the plurality of small lenses of the first lens array, wherein, in the second lens array, at least part of the small lenses among at least one column of the small lenses arranged in the direction of columns have optical centers different from optical centers of the other small lenses in the at least one column.

3. A lighting optical system in accordance with claim 2, wherein the part of the small lenses are eccentric lenses having optical centers at a different position from the position of the optical centers of the other small lenses, in order to cause an illumination area on a lighting area by the partial light fluxes passing through the part of the small lenses to be shifted in the direction of rows from an illumination area on the lighting area by the partial light fluxes passing through the other small lenses.

4. A lighting optical system in accordance with claim 2, wherein a plurality of small lenses located on an identical column are divided into a plurality of groups, small lenses included in an identical group have optical centers at an identical position relative to a lens center, and small lenses included in different groups have optical centers at different positions relative to the lens center.

5. A lighting optical system in accordance with claim 4, wherein the plurality of small lenses located on an identical column are divided into the plurality of groups so that a total quantity of light of the partial light fluxes passing through each of the plurality of groups is equal to each other.

6. A lighting optical system in accordance with claim 4, wherein the plurality of groups are at least two sections divided in the direction of columns.

7. A lighting optical system in accordance with claim 6, wherein the plurality of groups are two sections divided in the direction of columns, and optical centers of a plurality of small lenses included in one of the two sections and optical centers of a plurality of small lenses included in the other of the two sections are symmetrical about the lens center.

8. A lighting optical system in accordance with claim 2, wherein the plurality of small lenses included in the second lens array have optical centers that are arranged symmetrically about a center of the second lens array corresponding to a center of an optical axis of a light source.

9. A lighting optical system in accordance with claim 2, wherein the dividing and superposing optical system further comprises:

a superposing lens which superposes and condenses a plurality of partial light fluxes, which have passed through the plurality of small lenses in the first lens array and the plurality of small lenses in the second lens array, substantially on an illuminating position of each light modulation means; and a polarizing element interposed between the second lens array and the superposing lens, wherein the polarizing element comprises:

a polarizing beam splitter array which has plural sets of a polarization separating film and a reflecting film that are parallel to each other, the polarizing beam splitter array separating each of the plurality of partial light fluxes passing through the plurality of small lenses of the second lens array into two types of linear polarized light components; and a polarizer which equalizes polarizing directions of the two types of linear polarized light components separated by the polarizing beam splitter array.

10. A projection display apparatus, comprising:

a lighting optical system which emits light;

colored light separation means which separates the light into three colored rays;

three light modulation means which respectively modulate the three colored rays based on given image signals;

colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises a dividing and superposing optical system that divides a light flux into a plurality of partial light fluxes, which are arranged in directions of columns and rows, and superposes the plurality of partial light fluxes, the columns being substantially parallel to the central axis of the colored light combining means, the rows being substantially perpendicular to the direction of columns, and wherein the dividing and superposing optical system is constructed to shift, in the direction of rows, an illumination area on each light modulation means illuminated with part of the partial light fluxes among the partial light fluxes located on a same column from an illumination area illuminated with the other partial light fluxes among the partial light fluxes located on the identical column.

11. A projection display apparatus in accordance with claim 10, wherein the dividing and superposing optical system comprises:

a first lens array having a plurality of small lenses arranged in the directions of columns and rows; and a second lens array having a plurality of small lenses respectively arranged corresponding to the plurality of small lenses of the first lens array, wherein, in the second lens array, at least part of the small lenses among at least one column of the small lenses arranged in the direction of columns have optical centers different from optical centers of the other small lenses in the at least one column.

12. A projection display apparatus in accordance with claim 11, wherein the part of the small lenses are eccentric lenses having optical centers at a different position from the position of the optical centers of the other small lenses, in order to cause an illumination area on a lighting area by the partial light fluxes passing through the part of the small lenses to be shifted in the direction of rows from an illumination area on the lighting area by the partial light fluxes passing through the other small lenses.

13. A projection display apparatus in accordance with claim 11, wherein a plurality of small lenses located on an identical column are divided into a plurality of groups, small lenses included in an identical group have optical centers at an identical position relative to a lens center, and small lenses included in different groups have optical centers at different positions relative to the lens center.

14. A projection display apparatus in accordance with claim 13, wherein the plurality of small lenses located on an identical column are divided into the plurality of groups so that a total quantity of light of the partial light fluxes passing through each of the plurality of groups is equal to each other.

15. A projection display apparatus in accordance with claim 13, wherein the plurality of groups are at least two sections divided in the direction of columns.

16. A projection display apparatus in accordance with claim 15, wherein the plurality of groups are two sections divided in the direction of columns, and optical centers of a plurality of small lenses included in one of the two sections and optical centers of a plurality of small lenses included in the other of the two sections are symmetrical about the lens center.

17. A projection display apparatus in accordance with claim 11, wherein the plurality of small lenses included in the second lens array have optical centers that are arranged symmetrically about a center of the second lens array corresponding to a center of an optical axis of a light source.

18. A projection display apparatus in accordance with claim 11, wherein the dividing and superposing optical system further comprises:

a superposing lens which superposes and condenses a plurality of partial light fluxes, which have passed through the plurality of small lenses in the first lens array and the plurality of small lenses in the second lens array, substantially on an illuminating position of each light modulation means; and a polarizing element interposed between the second lens array and the superposing lens, wherein the polarizing element compres:

a polarizing beam splitter array which has plural sets of a polarization separating film and a reflecting film that are parallel to each other, the polarizing beam splitter array separating each of the plurality of partial light fluxes passing through the plurality of small lenses of the second lens array into two types of linear polarized light components; and a polarizer which equalizes polarizing directions of the two types of linear polarized light components separated by the polarizing beam splitter array.

* * * * *

UNITED STATES PATENT AND TRADEMARK OFFICE
CERTIFICATE OF CORRECTION

PATENT NO. : 5,973,840

DATED : October 26, 1999

INVENTOR(S): Yoshitaka ITOH et al.

It is certified that an error appears in the above-identified patent and that said Letters Patent is hereby corrected as shown below:

On the title page, item [87], the PCT Publication Date is incorrectly listed. It should be:

--[87] PCT Pub. No.: WO98/19212
PCT Pub. Date: May 7, 1998--

Signed and Sealed this

Thirteenth Day of February, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,973,840 Page 1 of 1
APPLICATION NO. : 09/091834
DATED : October 26, 1999
INVENTOR(S) : Yoshitaka Itoh et al.

It is certified that error appears in the above-identified patent and that said Letters Patent is hereby corrected as shown below:

On the title page, item [87], the PCT Publication Date is incorrectly listed. It should be:

--[87] PCT Pub. No.: WO98/19212
PCT Pub. Date: May 7, 1998--

Signed and Sealed this

Twenty-first Day of August, 2007

JON W. DUDAS
*Director of the United States Patent and Trademark Office*